United States Patent
Kudukoli et al.

(10) Patent No.: US 7,210,117 B2
(45) Date of Patent: *Apr. 24, 2007

(54) SYSTEM AND METHOD FOR PROGRAMMATICALLY GENERATING A GRAPHICAL PROGRAM IN RESPONSE TO PROGRAM INFORMATION

(75) Inventors: Ram Kudukoli, Austin, TX (US); Robert E. Dye, Austin, TX (US); Paul F. Austin, Austin, TX (US); Lothar Wenzel, Round Rock, TX (US); Jeffrey L. Kodosky, Austin, TX (US)

(73) Assignee: National Instruments Corporation, Austin, TX (US)

( * ) Notice: Subject to any disclaimer, the term of this patent is extended or adjusted under 35 U.S.C. 154(b) by 611 days.

This patent is subject to a terminal disclaimer.

(21) Appl. No.: 09/745,023

(22) Filed: Dec. 20, 2000

(65) Prior Publication Data

US 2001/0020291 A1    Sep. 6, 2001

Related U.S. Application Data

(63) Continuation-in-part of application No. 09/518,492, filed on Mar. 3, 2000, now Pat. No. 7,159,183, and a continuation-in-part of application No. 09/595,003, filed on Jun. 13, 2000.

(60) Provisional application No. 60/149,942, filed on Aug. 19, 1999.

(51) Int. Cl.
*G06F 9/44* (2006.01)
*G06F 3/00* (2006.01)

(52) U.S. Cl. .................. 717/100; 717/113; 717/109; 717/116; 715/762; 715/967

(58) Field of Classification Search ............... 717/109, 717/125, 104, 100, 127, 103, 105, 7, 107, 717/116, 113; 703/2; 709/318; 704/9; 345/771, 345/763; 434/118; 716/4; 712/220; 715/762, 715/967
See application file for complete search history.

(56) References Cited

U.S. PATENT DOCUMENTS 4,831,580 A    5/1989    Yamada (Continued)

FOREIGN PATENT DOCUMENTS

EP    0 817 035 A2    1/1998

(Continued)

OTHER PUBLICATIONS

MathWorks, Stateflow user's guid, 1997-2001.*

(Continued)

*Primary Examiner*—Meng-Al T. An
*Assistant Examiner*—Insun Kang
(74) *Attorney, Agent, or Firm*—Meyertons Hood Kivlin Kowert & Goetzel, P.C.; Jeffrey C. Hood; Jason L. Burgess

(57) ABSTRACT

A system and method for programmatically generating a graphical program or a portion of a graphical program in response to receiving program information is disclosed. During execution of a graphical program generation (GPG) program, the GPG program receives program information specifying functionality of the graphical program to be generated. In one embodiment the program information does not specify specific nodes in the graphical program or connections among the nodes. In response to the program information, the GPG program programmatically generates a graphical program (or graphical program portion) that implements the specified functionality.

81 Claims, 19 Drawing Sheets

U.S. PATENT DOCUMENTS

| | | | |
|---|---|---|---|
| 5,005,119 A | | 4/1991 | Rumbaugh et al. |
| 5,603,018 A | * | 2/1997 | Terada et al. ............... 712/220 |
| 5,697,788 A | * | 12/1997 | Ohta ......................... 434/118 |
| 5,732,277 A | * | 3/1998 | Kodosky et al. ............ 717/125 |
| 5,742,504 A | | 4/1998 | Meyer et al. |
| 5,850,548 A | * | 12/1998 | Williams .................... 717/107 |
| 5,862,372 A | | 1/1999 | Morris et al. ............... 717/109 |
| 5,870,590 A | * | 2/1999 | Kita et al. ..................... 716/4 |
| 5,911,070 A | * | 6/1999 | Solton et al. ............... 717/105 |
| 5,920,718 A | * | 7/1999 | Uczekaj et al. ............. 717/109 |
| 5,940,296 A | | 8/1999 | Meyer |
| 5,966,532 A | * | 10/1999 | McDonald et al. ......... 717/105 |
| 6,018,627 A | * | 1/2000 | Iyengar et al. .............. 717/103 |
| 6,023,578 A | * | 2/2000 | Birsan et al. ............... 717/105 |
| 6,053,951 A | | 4/2000 | McDonald et al. |
| 6,118,448 A | * | 9/2000 | McMillan et al. .......... 717/127 |
| 6,138,171 A | * | 10/2000 | Walker ....................... 709/318 |
| 6,154,875 A | * | 11/2000 | Tanaka et al. .............. 717/107 |
| 6,212,672 B1 | * | 4/2001 | Keller et al. ................ 717/104 |
| 6,216,261 B1 | * | 4/2001 | Mitchell ..................... 717/107 |
| 6,219,628 B1 | * | 4/2001 | Kodosky et al. ............... 703/2 |
| 6,298,474 B1 | * | 10/2001 | Blowers et al. ............. 717/104 |
| 6,366,300 B1 | * | 4/2002 | Ohara et al. ................ 345/771 |
| 6,405,361 B1 | * | 6/2002 | Broy et al. .................. 717/100 |
| 6,425,120 B1 | * | 7/2002 | Morganelli et al. ......... 717/109 |
| 6,437,805 B1 | * | 8/2002 | Sojoodi et al. ............. 345/763 |
| 6,453,450 B1 | | 9/2002 | Walter |
| 6,453,464 B1 | | 9/2002 | Sullivan et al. |
| 6,499,136 B1 | * | 12/2002 | Dempsey et al. ........... 717/127 |
| 6,564,368 B1 | * | 5/2003 | Beckett et al. .............. 717/113 |
| 6,606,741 B2 | * | 8/2003 | Kojima et al. .............. 717/109 |
| 6,637,022 B1 | | 10/2003 | Weeren et al. |
| 6,738,964 B1 | * | 5/2004 | Zink et al. .................. 717/105 |
| 2001/0020291 A1 | | 9/2001 | Kudukoli et al. |
| 2001/0024211 A1 | | 9/2001 | Kudukoli et al. |
| 2001/0034879 A1 | | 10/2001 | Washington et al. |
| 2001/0035879 A1 | | 11/2001 | Washington et al. |
| 2001/0037496 A1 | * | 11/2001 | Simonyi ......................... 717/7 |
| 2002/0083413 A1 | | 6/2002 | Kodosky et al. |
| 2002/0089538 A1 | | 7/2002 | Wenzel et al. |
| 2002/0129333 A1 | | 9/2002 | Chandhoke et al. |
| 2003/0046061 A1 | * | 3/2003 | Preston et al. .................. 704/9 |
| 2003/0167455 A1 | * | 9/2003 | Iborra et al. ................ 717/105 |
| 2004/0034696 A1 | | 2/2004 | Joffrain et al. |
| 2004/0034847 A1 | | 2/2004 | Joffrain et al. |
| 2005/0028138 A1 | | 2/2005 | Case et al. |
| 2005/0091602 A1 | | 4/2005 | Ramamoorthy et al. |

FOREIGN PATENT DOCUMENTS

EP          1077404          2/2001

OTHER PUBLICATIONS

NI, LabView evaluation guide, Jan. 1998.*

"LabVIEW™ User Manual"; National Instruments Corporation; Jan. 1998; pp. 2-1-2-23 and 22-1-22-5; Austin, TX, U.S.A.

"BridgeVIEW™ and LabVIEW™ G Programming Reference Manual"; National Instruments Corporation; Jan. 1998; pp. 21-1-21-11; Austin, TX, U.S.A.

Massimiliano Poletto, Wilson C. Hsieh, Dawson R. Engler and M Frans Kaashoek; "C and tcc: A Language and Compiler for Dynamic Code Generation"; ACM Transactions on Programming Languages and Systems; Mar. 1999; pp. 324-369; vol. 21, No. 2.

Orlando Loques, Julius Leite and Enrique Vinicio Carrera E.; "P-RIO: A Modular Parallel-Programming Environment"; IEEE Concurrency; Jan.-Mar. 1998; pp. 47-56.

European search report for application No. EP 00 11 7301 mailed Apr. 12, 2006.

* cited by examiner

Open Application Reference Node

Open VI Reference Node

New VI Reference Node

Open VI Object Reference Node

New VI Object Reference Node

Upcast Reference Node

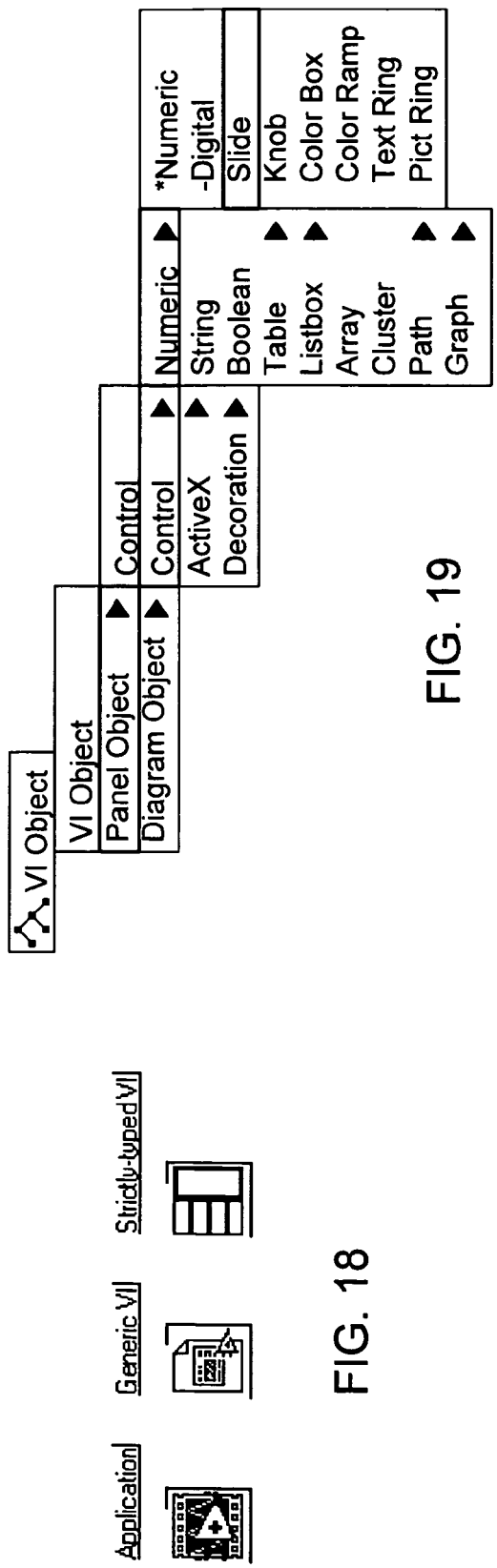
FIG. 18
FIG. 19
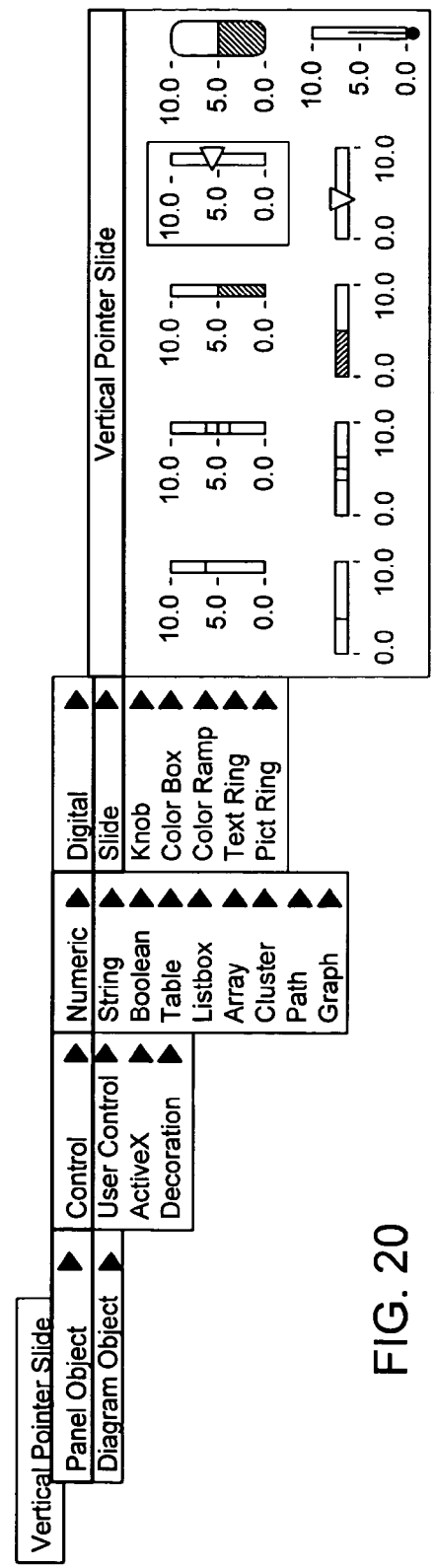
FIG. 20

SYSTEM AND METHOD FOR PROGRAMMATICALLY GENERATING A GRAPHICAL PROGRAM IN RESPONSE TO PROGRAM INFORMATION

PRIORITY CLAIM

This application is a continuation-in-part of U.S. patent application Ser. No. 09/518,492 titled "System and Method for Programmatically Creating a Graphical Program", filed Mar. 3, 2000 now U.S. Pat. No. 7,159,183, whose inventors were Ram Kudukoli, Robert Dye, Melanie Jensen, and Yumiko Kawachi, which claims benefit of priority of U.S. provisional Patent Application Ser. No. 60/149,942 titled "System and Method for Programmatically Creating a Graphical Program" and filed Aug. 19, 1999.

This is also a continuation-in-part of U.S. patent application Ser. No. 09/595,003 titled "System and Method for Automatically Generating a Graphical Program to Implement a Prototype", filed Jun. 13, 2000, whose inventors were Nicolas Vazquez, Jeffrey L. Kodosky, Ram Kudukoli, Kevin L. Schultz, Dinesh Nair, Christophe Caltagirone.

FIELD OF THE INVENTION

The present invention relates to the field of graphical programming, and more particularly to a system and method for programmatically generating a graphical program in response to program information specifying functionality of the graphical program.

DESCRIPTION OF THE RELATED ART

Traditionally, high level text-based programming languages have been used by programmers in writing application programs. Many different high level programming languages exist, including BASIC, C, JAVA, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, JAVA, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. The diagram may have one or more of data flow, control flow and/or execution flow representations. In response to the user constructing a diagram or graphical program using the block diagram editor, data structures may be automatically constructed which characterize an execution procedure which corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for measuring, controlling, or modeling devices, such as instruments, processes or industrial automation hardware, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation and numerical analysis, as well as for any type of general programming.

In creating a graphical program, a user may create a front panel or user interface panel. The front panel may include various user interface elements or front panel objects, such as controls and/or indicators, that represent or display the respective input and output that will be used by the graphical program or VI, and may include other icons which represent devices being controlled. The front panel may be comprised in a single window of user interface elements, or may comprise a plurality of individual windows each having a user interface element, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel objects, e.g., the GUI, may be embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using front panel controls. This input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, machine vision applications, and motion control, among others.

As graphical programming environments have matured and grown in popularity and complexity, it has become increasingly desirable to provide high-level tools which help a user create a graphical program. It also becomes increasingly desirable to integrate graphical programming environments with other applications and programming environments. In order to provide the desired tools or the desired integration, it would be greatly desirable to provide the ability to dynamically or programmatically generate a graphical program or a portion of a graphical program. For example, for various applications, it would be desirable to provide various types of program information to a program, wherein the program information specifies functionality of a graphical program (or portion of a graphical program) to be programmatically generated.

As described above, a user typically creates a graphical program within a graphical programming environment by interactively or manually placing icons or nodes representing the desired blocks of functionality on a diagram, and connecting the icons/nodes together to represent one or more of the data flow, control flow, and/or execution flow of the program. The ability to programmatically generate a graphical program in response to program information would enable a graphical program to automatically be generated without this type of interactive user input.

SUMMARY OF THE INVENTION

One embodiment of the present invention comprises a system and method for programmatically generating a graphical program or a portion of a graphical program, in response to receiving program information. The program information may specify functionality of the graphical program or graphical program portion to be generated. A graphical program generation program, referred to herein as a "GPG program", may be executed, wherein the GPG program may be operable to receive the program information. As discussed below, the program information may comprise any type of information that specifies functionality of or aspects of the graphical program desired to be created. In response to the program information, the GPG program may programmatically generate a graphical program (or graphical program portion) that implements the specified functionality. Thus, the GPG program may generate different graphical programs, depending on the program information received.

In programmatically generating a graphical program, the GPG program may programmatically generate a block diagram portion comprising a plurality of connected icons or nodes, wherein the connected icons or nodes may visually or graphically indicate the functionality of the graphical program. The GPG program may also programmatically generate a user interface panel or front panel which may be used to provide input to and/or display output from the graphical program. For example, the GPG program may be constructed to programmatically generate one or more of a LabVIEW program, a VEE program, a Simulink program, etc.

The GPG program that generates the graphical program may be constructed using any of various programming languages, methodologies, or techniques. For example, the GPG program may itself be a graphical program, or the GPG program may be a text-based program, or the GPG program may be constructed using a combination of graphical and text-based programming environments.

Also, the GPG program may have any of various purposes or applications. In some embodiments, the GPG program may include or be associated with a program or application which a user utilizes to construct or characterize a computational process. In response to the specified computational process, the GPG program may be used to programmatically generate a graphical program to implement the computational process. For example, in one embodiment a state diagram editor program may be used to construct a state diagram characterizing a computational process, in response to user input. The GPG program may then be executed, wherein the GPG program receives information on the state diagram and programmatically generates a graphical program that implements functionality specified by the state diagram. As another example, a prototyping application may be used by the user to construct a prototype, e.g., in order to characterize an algorithm at a high level. In this case, the GPG program may then receive information on the prototype and programmatically generate a graphical program that implements the prototype. As another example, a test executive program may be executed which enables the user to construct a test executive sequence, e.g., to perform a series of tests on a unit under test. In this case, the GPG program may then programmatically generate a graphical program operable to perform the series of tests when executed.

In other embodiments, the GPG program may include or be associated with a program or application that directly aids the user in creating a graphical program. For example, the GPG program may be included in a graphical programming development application. In this case the graphical programming development application may be operable to receive user input specifying desired functionality and the GPG program may automatically, i.e., programmatically, add a portion of graphical program code implementing the specified functionality to the user's program. The user input may be received, for example, via one or more "wizard" user interface dialogs enabling the user to specify various options. Such graphical program code generation wizards may greatly simplify the user's task of implementing various operations. As an example, it is often difficult for developers of instrumentation applications to properly implement code to analyze an acquired signal, due to the inherent complexity involved. By enabling the developer to easily specify the desired functionality through a high-level user interface, the GPG program can receive this information and automatically create graphical code to implement the signal analysis. Furthermore, since the graphical code is generated programmatically, the code may be optimized, resulting in an efficient program and a readable block diagram without unnecessary code.

In other embodiments, the GPG program may be a program or application operable to automatically or programmatically translate an existing program into a graphical program. The GPG program may examine the existing program and programmatically generate a graphical program that performs the same or substantially the same functionality, or performs a portion of the functionality, of the existing program. In one embodiment, the existing program may be a text-based program, such as a C program. In another embodiment, the existing program may itself be a graphical program. For example, although graphical programs created using different graphical programming environments are similar in some respects, the graphical programs typically cannot be easily transferred across different graphical programming environments for editing or execution. For example, different graphical programming environments provide different nodes for inclusion in a block diagram, store program files in different formats, etc. Thus, if an existing graphical program associated with one programming environment is desired to be ported to a new programming environment, in the current prior art this would have to be done manually. According to one embodiment of the invention, the GPG program may examine the existing graphical program (or may examine abstract information specifying the existing graphical program) and may programmatically generate a new graphical program associated with the new programming environment.

In addition to the examples given above, a GPG program may receive any other type of information and programmatically generate a graphical program based on the received information. It is noted that, in various embodiments, the GPG program may receive the information used in generating the graphical program in any of various ways. The information may be received from the user, from another program, or from other sources, such as a file or database.

The information may comprise information of any type, including text or binary information structured in any of various ways. The information may be self-describing, and/or the GPG program may include knowledge of how to interpret the information in order to generate the appropriate graphical program. The information may completely specify the functionality of the graphical program desired to be created, or may specify only a portion of the functionality of the graphical program desired to be created. In the latter instance the GPG program may not be able to create a completely functioning graphical program, but rather may only be able to create a portion or fragment of a graphical program. In this instance, the user may be expected to manually complete the graphical program.

As an example, consider a state diagram editor program usable for constructing a state diagram. In this example, the GPG program may be the state diagram editor program itself or may be coupled with the state diagram editor program. For example, the state diagram editor program may receive user input specifying state diagram information. The state diagram editor program may then programmatically generate a graphical program to implement functionality specified by the state diagram information, e.g., in response to the user selecting a menu option to generate the graphical program. In other embodiments, the GPG program may be separate from the state diagram editor program. For example, when the user selects the menu option to generate the graphical program, the state diagram editor program may provide the state diagram information to the GPG program, which then generates the graphical program based on this information. In another embodiment, a user may invoke the GPG program separately and request the GPG program to generate a graphical program, e.g., by specifying a state diagram file. The GPG program may receive the state diagram information in any of various ways formats, e.g., as binary data, XML data, etc.

In most of the examples given above, functionality of the graphical program to be generated is specified explicitly by the received information. For example, a state diagram, user input specified via a wizard interface, a prototype, a test executive sequence, and an existing program, all explicitly specify, to varying degrees, functionality which the graphical program should implement.

In other embodiments the received information by itself may not explicitly or inherently specify functionality of the graphical program to be generated. In a case such as this, the functionality of the generated graphical program may be determined mainly by the nature or type of the GPG program. For example, consider two different GPG programs, program A and program B, which are both operable to retrieve numeric data from a database and create a graphical program based on the numeric data. Program A may be operable to create a graphical program which, when executed, displays a user interface to visually graph the numeric data. For example, program A may receive user input specifying various display options desired and may programmatically generate the graphical program such that the graphical program is operable to display the numeric data as specified by the user. Program B, on the other hand, may be operable to create a graphical program which, when executed, performs a statistical analysis of the data and displays the result of the analysis. For example, program B may receive user input specifying various analysis options desired and may programmatically generate the graphical program such that the graphical program is operable to analyze the numeric data as specified by the user. Thus, in these examples, the functionality of the graphical program is determined mainly by the GPG program that generates the graphical program, and only determined to a small degree (or no degree) by the received information.

Thus, in various embodiments, the functionality of the graphical program may be determined by the received information and/or the GPG program. In some cases the functionality may be specified almost entirely by the received information. For example, in a case where the GPG program programmatically translates an existing program to a new graphical program, the functionality of the new graphical program may be specified entirely by the existing program. In other cases, the received information and the GPG program may each determine a portion of the functionality. For example, in a case where the GPG program generates a graphical program to implement a test executive sequence, the test executive sequence information may determine the body of the program which includes the code for executing the tests, but the GPG program may be operable to add additional functionality to the graphical program, e.g., by adding code operable to prompt the user for a log file and save test results to the log file, code to display a user interface indicating the current unit under test and the current test being performed, etc.

In a typical case, the implementation of the graphical program code is determined mainly or entirely by the GPG program, although the received information may influence the manner in which the GPG program generates the code, or the GPG program may receive separate information influencing the code generation. For example, consider a GPG program operable to translate an existing graphical program to a new graphical program, e.g., in order to port the existing graphical program to a new programming environment. In one embodiment, the GPG program may be operable to generate the new graphical program in such a way as to match the existing graphical program as closely as possible in appearance. In other words, the new graphical program may be generated so that when the user sees the block diagram of the new graphical program, the block diagram appears substantially the same as the block diagram of the existing graphical program, e.g., in terms of the layout and connections among the block diagram nodes. In a similar manner, the user interface or front panel of the new graphical program may be programmatically created to closely resemble the user interface or front panel of the existing graphical program. In another embodiment, the GPG program may be operable to implement the new graphical program differently, e.g., by optimizing the code where possible. In this example, the functionality of the generated graphical program may be the same in either case, but the new graphical program may be implemented in a different way and have a different appearance than the existing graphical program.

The GPG program may also receive input specifying how to implement the graphical program. For example, in the case above, the user may specify whether or not to perform optimizations when translating an existing graphical program. For example, the new programming environment may support downloading the generated graphical program to a hardware device for execution. If the user desires to download the generated graphical program to a hardware device, e.g., for use in a real-time application, then it may be important to optimize the new program. Otherwise, it may be more important to implement the generated graphical program similar to how the existing graphical program is implemented.

In one embodiment, the GPG program may provide extended support for specifying graphical program code implementation, beyond the ability to specify simple options. For example, the GPG program may support functionality or plug-ins specifying code generation information for various cases. Referring again to the program translation example above, each plug-in may specify how to generate code intended for execution on a particular hardware device. For example, if the generated program is to be run on an FPGA, the generation of the code may be optimized depending on the number of gates available on that particular FPGA.

In various embodiments, an association between a generated graphical program and the received program information used in generating the graphical program may be maintained. For example, this association may enable a user to execute the automatically generated program and then return to an application from which the program information originates, e.g., in order to view or edit the program information. For example, consider a prototyping environment application which enables a user to develop a prototype characterizing an algorithm. The GPG program, which may be part of the prototyping environment application, may programmatically generate a graphical program implementing the developed prototype. The user may then execute the graphical program, and if a problem with the program is discovered, the association may enable the user to return to the prototyping environment application in order to view or modify the prototype used to generate the program. In one embodiment, a generated graphical program may be "locked", requiring the user to explicitly unlock the graphical program before the graphical program can be modified within the graphical programming environment. Locking the program may facilitate the retrieval or re-creation of the program information that was used to generate the program.

In various embodiments, the GPG program may be operable to generate any of various types of graphical programs. For example, as discussed above, a generated graphical program may be targeted toward a particular graphical programming development environment application. The GPG program may thus utilize proprietary features or create files that are formatted in a manner expected by the graphical programming development environment. This may be desirable or necessary when the graphical programming development environment includes a runtime environment that is required for the created graphical program to execute. Examples of graphical programming development environments include LabVIEW, BridgeVIEW, DasyLab, and DiaDem from National Instruments, VEE from Hewlett Packard, Simulink from The MathWorks, Softwire from Measurement Computing, Inc., Sanscript from Northwoods Software, WiT from Coreco, and Vision Program Manager from PPT Vision, among others.

In various embodiments, the graphical program may be generated using any of various methods or techniques. Generating the graphical program may comprise generating one or more files or data structures defining the graphical program. When a user interactively develops a graphical program from within a graphical programming environment, the graphical programming environment may create one or more program files. For example, the program files may specify information such as a set of nodes that the graphical program uses, interconnections among these nodes, programmatic structures such as loops, etc. In other cases, the program files may store various data structures, e.g., in binary form, which the graphical programming environment uses to directly represent the graphical program. Thus, in programmatically generating the graphical program, the GPG program may programmatically generate one or more files or data structures representing the graphical program, wherein these files may be structured or formatted appropriately for a particular graphical programming environment.

In one embodiment, a graphical programming development environment may provide an application programming interface (API) which the GPG program can use to programmatically generate the graphical program. For example, for each node, user interface element, or other object of the graphical program, the API may be called to programmatically add the object to the graphical program, connect the object to other objects of the graphical program, etc. Thus, any necessary files or other constructs needed by the graphical programming environment in order to use the generated graphical program may be automatically created as a result of calling the API. Particular embodiments of such an API are discussed below.

In various cases, a graphical program generated by a GPG program in response to program information may be a fully working program. Thus, the user may load the generated graphical program into the graphical programming environment, execute the program, etc. In other cases, the generated graphical program may not be a complete program. As an example, if an existing program is translated to a graphical program, it may not be possible to translate the entire program. For example, the existing program may utilize functions which do not exist in the graphical programming environment to which the program is to be ported. As another example, the received program information may specify functionality which does not exist in the graphical programming environment for which the new graphical program is being generated. However, the GPG program may still create a partial graphical program, making it relatively easy for the user to complete the graphical program. In still other cases, it may be desirable to programmatically generate only a graphical code portion, e.g., as discussed above in the case of user interface wizard tools that aid the user in program development. In one embodiment, the GPG program may programmatically generate a graphical program portion that relies on functionality that is supported in the target graphical programming environment in which the graphical program is being created. The GPG program may also include references in the created graphical program to outside libraries, such as C libraries, which implement the remaining portion of the functionality specified in the program information that could not be implemented directly in the created graphical program.

BRIEF DESCRIPTION OF THE DRAWINGS

A better understanding of the present invention can be obtained when the following detailed description of the preferred embodiment is considered in conjunction with the following drawings, in which:

FIG. 18 illustrates user interface controls which may be placed on a front panel in order to interactively obtain a reference to a server program or a graphical program to edit;

FIGS. 19 and 20 illustrate how a user may select graphical program objects to create or edit by choosing from hierarchical menus;

Figure 1:
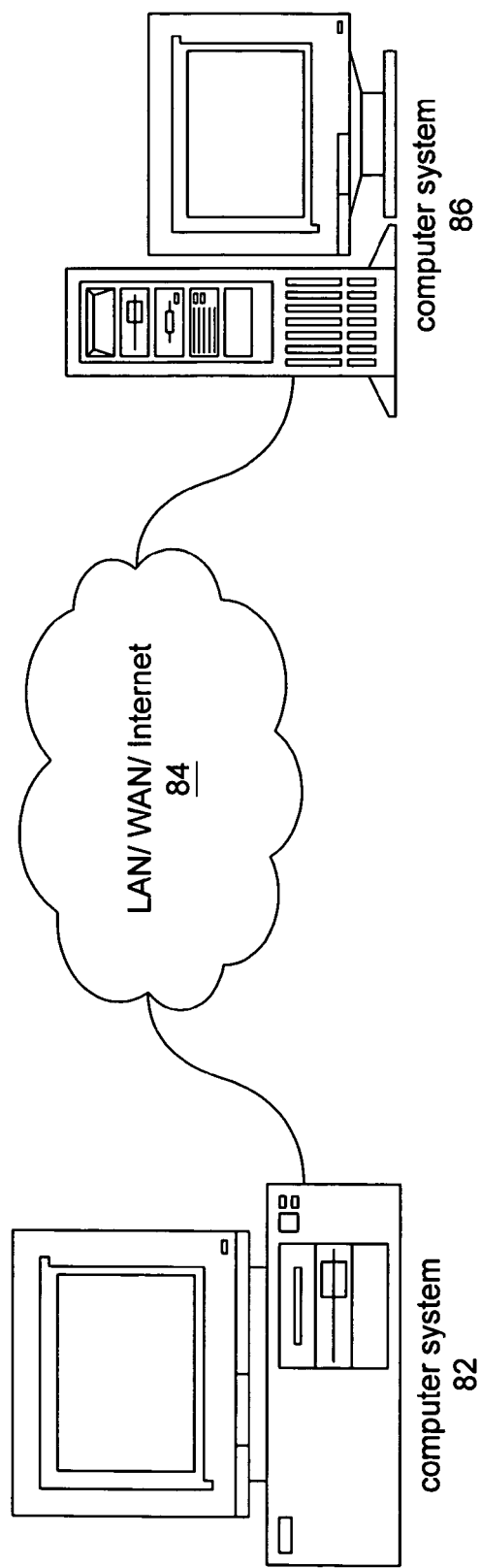
FIG. 1 illustrates a computer system connected through a network to a second computer system.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. Pat. No. 5,481,741 titled "Method and Apparatus for Providing Attribute Nodes in a Graphical Data Flow Environment," issued on Jan. 2, 1996.

U.S. Pat. No. 6,064,812 titled "System and Method for Developing Automation Clients Using a Graphical Data Flow Program," issued on May 16, 2000.

U.S. Pat. No. 6,102,965 titled "System and Method for Providing Client/Server Access to Graphical Programs," issued on Aug. 15, 2000.

U.S. patent application Ser. No. 09/136,123 titled "System and Method for Accessing Object Capabilities in a Graphical Program" filed Aug. 18, 1998.

U.S. patent application Ser. No. 09/518,492 titled "System and Method for Programmatically Creating a Graphical Program", filed Mar. 3, 2000.

U.S. patent application Ser. No. 09/595,003 titled "System and Method for Automatically Generating a Graphical Program to Implement a Prototype," filed Jun. 13, 2000.

U.S. patent application Ser. No. 08/912,445 titled "Embedded Graphical Programming System" filed on Aug. 18, 1997, whose inventors were Jeffrey L. Kodosky, Darshan Shah, Samson DeKey, and Steve Rogers.

U.S. patent application Ser. No. 08/912,427 titled "System and Method for Converting Graphical Programs Into Hardware Implementations" filed on Aug. 18, 1997, whose inventors were Jeffrey L. Kodosky, Hugo Andrade, Brian Keith Odom, and Cary Paul Butler.

FIG. 1—Computer System Connected to a Network

FIG. 1 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), WAN (wide area network), or the Internet, among others.

The computer system 82 may include or store a computer program, referred to herein as a graphical program generation program, or a "GPG program", that is operable to receive program information and programmatically generate a graphical program based on the program information. One embodiment of a method for programmatically generating a graphical program is described below.

In one embodiment, the GPG program may be implemented as a self-contained program or application that includes all necessary program logic for generating the graphical program. In another embodiment, the GPG program may comprise a client portion and a server portion (or client program and server program), wherein the client portion may request or direct the server portion to generate the graphical program. For example, the client portion may utilize an application programming interface (API) provided by the server portion in order to generate the graphical program. In other words, the client portion may perform calls to the API provided by the server portion, and the server portion may execute functions or routines bound to these calls to generate the graphical program. In one embodiment, the server portion may be an instance of a graphical programming environment application. For example, the LabVIEW graphical programming environment application enables client programs to interface with a LabVIEW server in order to programmatically generate or modify graphical programs.

As used herein, the term "GPG program" is intended to include any of various implementations of a program (or programs) that are executable to programmatically generate a graphical program based on received program information. For example, the term "GPG program" is intended to include an embodiment in which the GPG program is a self-contained program or application (not implemented as a client/server program) that includes all necessary program logic for programmatically generating a graphical program. The term "GPG program" is also intended to include an embodiment in which a combination of a client portion (or client program) and server portion (or server program) operate together to programmatically generate the graphical program. The term "GPG program" is also intended to include other program implementations.

In an embodiment in which a client program interfaces with a server program to generate the graphical program, the server program may execute on the same computer system as the client program or may execute on a different computer system, e.g., a different computer system connected via a network. For example, in FIG. 1, the client program may execute on the computer system 82, and the server program may execute on the computer system 86. In this case, the graphical program, e.g., files representing the graphical program may be created on the computer system 82, or 86, or on a different computer system.

It is noted that the GPG program may be implemented using any of various programming technologies or methodologies. Where the GPG program is implemented as client and server programs, each of these programs may utilize procedure-based techniques, component-based techniques, and/or object-oriented techniques, among others. The programs may be written using any combination of text-based or graphical programming languages. Also, the programs may be written using distributed modules or components so that each program may reside on any combination of computer system 82, computer system 86, and other computer systems connected to the network 84. Also, in various embodiments, the client program may interface with the server program through a proxy software component or program.

Figure 2A:
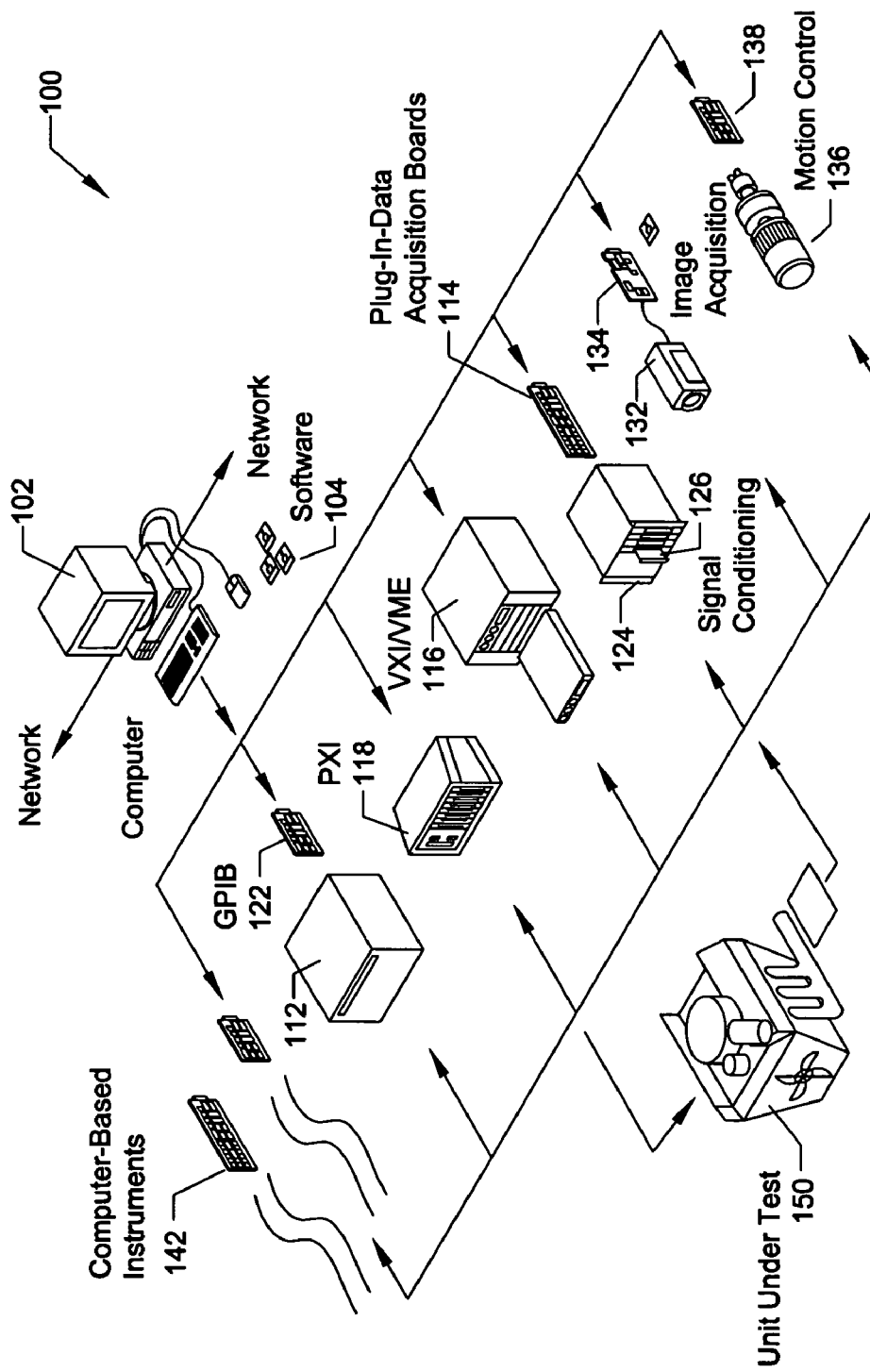
FIGS. 2A and 2B illustrate representative instrumentation and process control systems including various I/O interface options.
Figure 2B:
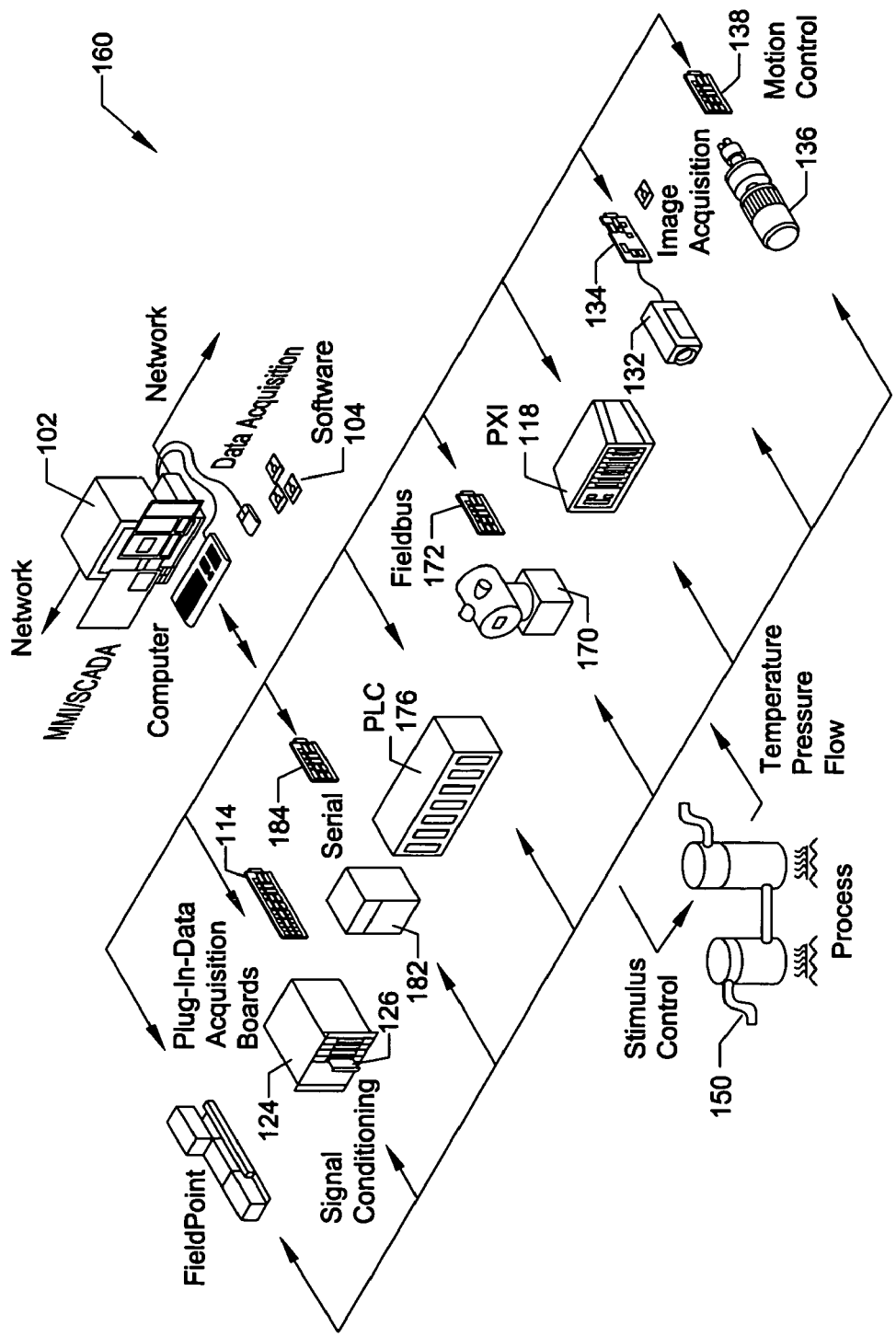

FIGS. 2A and 2B—Instrumentation and Industrial Automation Systems

FIGS. 2A and 2B illustrate exemplary systems which may store or use a GPG program and/or a server program which are operable to programmatically generate a graphical program. Also, these systems may execute a programmatically generated graphical program. For example, the graphical program may perform an instrumentation function, such as a test and measurement function or an industrial automation function. It is noted that the GPG program, the server program, and/or a generated graphical program may be stored in or used by any of various other types of systems as desired and may implement any function or application as desired. Thus, FIGS. 2A and 2B are exemplary only.

FIG. 2A illustrates an exemplary instrumentation control system 100. The system 100 comprises a host computer 102 which connects to one or more instruments. The host computer 102 may comprise a CPU, a display screen, memory, and one or more input devices such as a mouse or keyboard as shown. The computer 102 connects through the one or more instruments to analyze, measure, or control a unit under test (UUT) or process 150. In one embodiment, the computer 102 may be either of the computers 82 or 86 shown in FIG. 1, which as described above are operable to programmatically generate graphical programs based on received information. Also, in one embodiment, the computer 102 may execute a generated graphical program, such as a graphical program that controls or models one or more of the connected instruments.

The one or more instruments may include one or more of a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via the GPIB interface card 122 comprised in the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 may be coupled to the computer 102 via a VXI bus, MXI (e.g., MXI-3) bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument will not be present of each interface type, and in fact many systems may only have one or more instruments of a single interface type, such as only GPIB instruments. The one or more instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 102 which connects to one or more devices or instruments. The computer 102 may comprise a CPU, a display screen, memory, and one or more input devices such as a mouse or keyboard as shown. The computer 102 may connect through the one or more devices to a process or device 150 to perform an automation function, such as MMI (Man Machine Interface), SCADA (Supervisory Control and Data Acquisition), portable or distributed data acquisition, process control, advanced analysis, or other control. In one embodiment, the computer 102 may be either of the computers 82 or 86 shown in FIG. 1, which as described above are operable to programmatically generate graphical programs based on received information. Also, in one embodiment, the computer 102 may execute a generated graphical program, such as a graphical program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, USB, or IEEE 1394 or 1394.2 provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the computer system(s) 102 preferably includes a memory medium(s) on which one or more computer programs or software components according to one embodiment of the present invention are stored. For example, the memory medium may store a GPG program which is executable to receive program information and programmatically generate a graphical program based on the information. The same or a different memory medium may also store a server program with which a client portion of the GPG program interfaces in order to generate the graphical program. The memory medium may also store a programmatically generated graphical program. The memory medium may also store a graphical programming development application operable execute or edit the programmatically generated graphical program. It is noted that various of these software programs may be stored on different computer systems, as described above with reference to FIG. 1. Also, in various embodiments, various of the above software programs may be implemented or combined in different ways. For example, a graphical programming development application may implement the server program with which a client program interfaces to programmatically generate a graphical program.

The term "memory medium" is intended to include an installation medium, e.g., a CD-ROM, floppy disks 104, or tape device, a computer system memory or random access memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

In one embodiment, the GPG program and/or the resulting graphical program that is programmatically generated may be designed for data acquisition/generation, analysis, and/or display, and for controlling or modeling instrumentation or industrial automation hardware. For example, in one embodiment, the National Instruments LabVIEW graphical programming development application, which provides specialized support for developers of instrumentation applications, may act as the server program. In this embodiment, the client program may be a software program that receives and processes program information and invokes functionality of the LabVIEW graphical programming environment. The client program may also be a program involved with instrumentation or data acquisition.

However, it is noted that the present invention can be used for a plethora of applications and is not limited to instrumentation or industrial automation applications. In other words, FIGS. 2A and 2B are exemplary only, and graphical programs for any of various types of purposes may be generated by a GPG program designed for any of various types of purposes, wherein the programs are stored in and execute on any of various types of systems. Various examples of GPG programs and generated graphical programs are discussed below.

Figure 3:
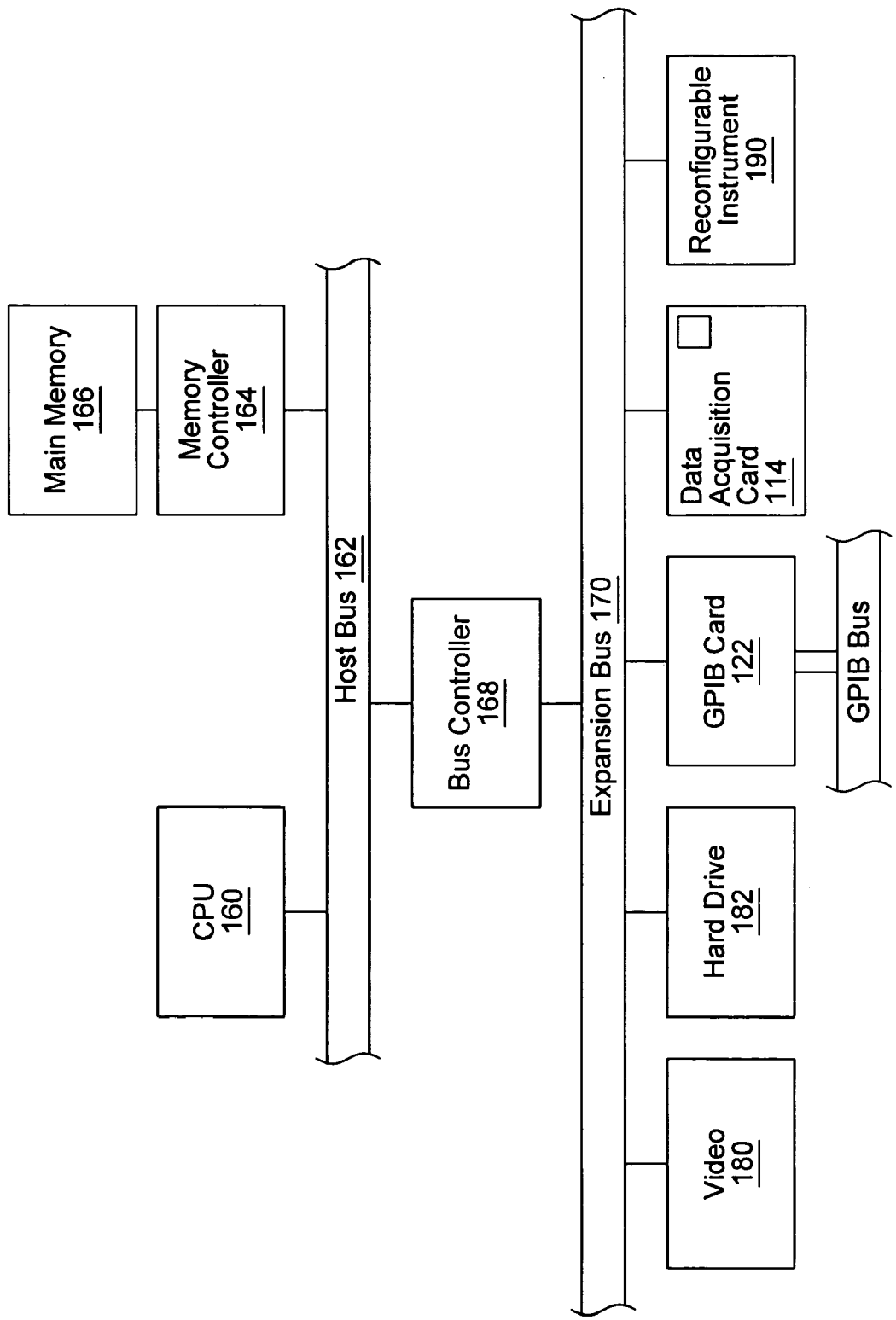
FIG. 3 is a block diagram of the computer system of FIGS. 1, 2A and 2B.

FIG. 3—Computer System Block Diagram

FIG. 3 is a block diagram of the computer system illustrated in FIGS. 1, 2A and 2B. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store computer programs according to one embodiment of the present invention. The main memory 166 also stores operating system software as well as the software for operation of the computer system, as well known to those skilled in the art. The computer programs of the present invention will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A) and a GPIB interface card 122 which provides a GPIB bus interface to the GPIB instrument 112 (of FIG. 2A). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA, or a processor and memory, which may execute a real time operating system. According to one embodiment of the invention, a programmatically generated graphical program may be downloaded and executed on the reconfigurable instrument 190. For example, a graphical programming environment with which the graphical program is associated may provide support for downloading a graphical program for execution on configurable logic in a real time system. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 2A.

Figure 4:
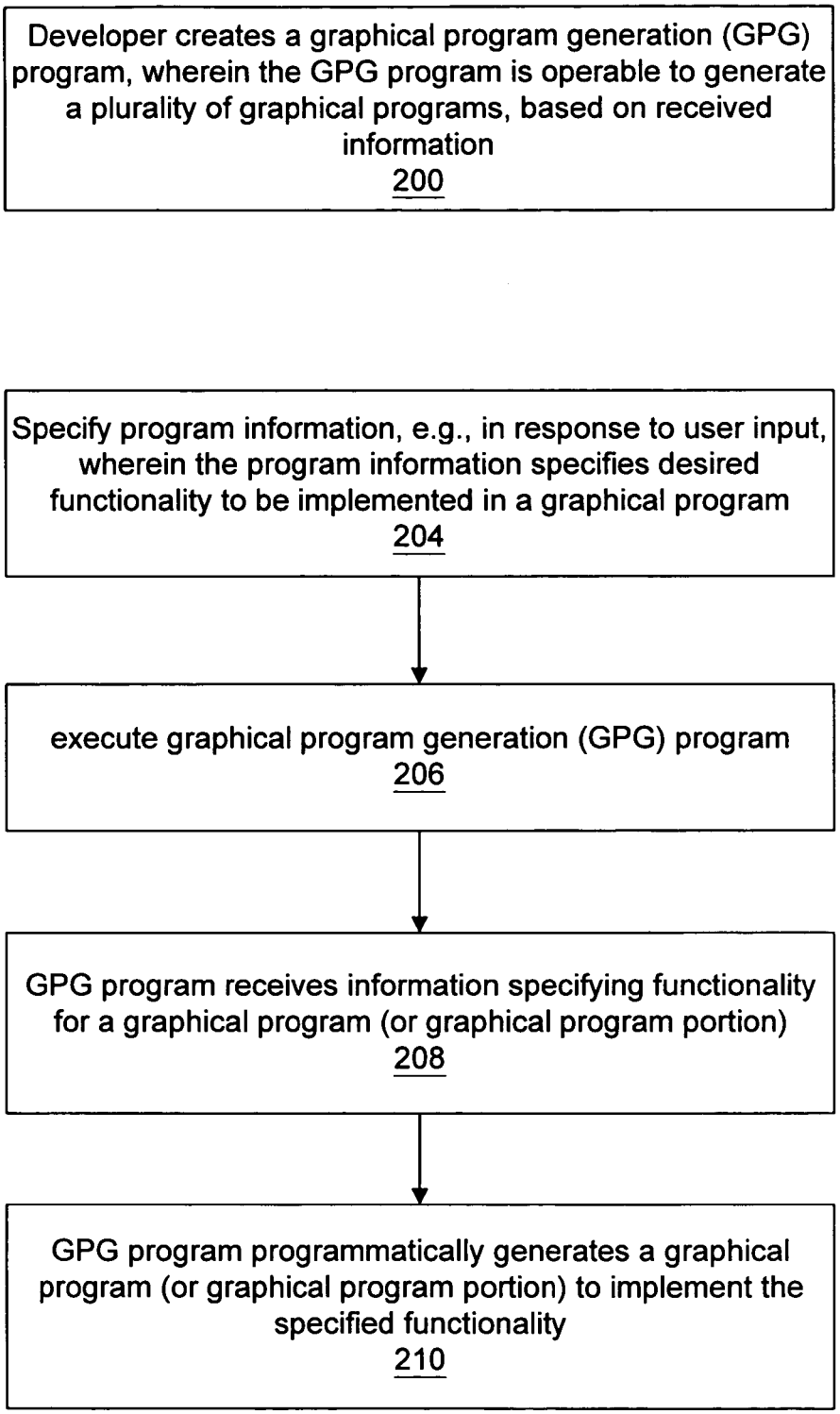
FIG. 4 is a flowchart diagram illustrating one embodiment of a method for programmatically generating a graphical program in response to receiving program information.

FIG. 4—Programmatic Creation of a Graphical Program

In prior systems, a user interactively or manually creates or edits a graphical program. For example, the user may interactively add various objects or icons to a graphical program block diagram, connect the objects together, etc. In contrast, one embodiment of the present invention comprises a system and method for programmatically generating a graphical program (or portion of a graphical program) without requiring this type of user interaction.

FIG. 4 is a flowchart diagram illustrating one embodiment of a method for programmatically generating a graphical program. In step 200, a graphical program generation (GPG) program may be created, wherein the GPG program is operable to programmatically generate a plurality of graphical programs, based on received information. As described below, the GPG program may be associated with any of various purposes or applications. Also, as discussed above, the GPG program may be implemented in various ways, e.g., using graphical and/or text-based programming environments. For example, the GPG program may be a text-based program, such as a program written using C, C++, JAVA, Basic, Visual Basic, FORTRAN, Pascal, or another text-based programming language. Also, the GPG program may itself be a graphical program. For example, the GPG program may be a graphical program interactively created in response to user input.

As described below, the GPG program may be implemented based on a client/server programming model. The client portion may call an application programming interface (API) provided by the server portion usable for programmatically creating the new graphical program. For example, a text-based GPG program may include text-based code for calling various API functions or methods, while a graphical GPG program may include various graphical nodes which are operable to invoke functions of the API. The creation of the GPG program may be performed by a developer, wherein the GPG program may be used as a tool for the programmatic creation of graphical programs by users or other developers.

As shown in step 204, program information for the new graphical program (or graphical program portion) to be generated may be specified, e.g., in response to user input.

As described below, this program information may comprise any of various types of information and may specify functionality of the new graphical program.

In step 206, the GPG program may be executed. The GPG program may be executed in any type of computer system.

In step 208, the GPG program may receive the program information specifying the functionality for the graphical program or graphical program portion. As described below, the GPG program may receive any type of information from any type of source.

In step 210, the GPG program may programmatically generate a graphical program or graphical program portion to implement the functionality specified by the received information. In other words, in response to receiving the information in step 208, the GPG program may programmatically generate a new graphical program based on the information. The graphical program may be programmatically generated with little or no user input received during this creating. In one embodiment, the graphical program is programmatically generated with no user input required. In another embodiment, the user may be prompted for certain decisions during programmatic generation, such as the type of graphical program, the look and feel of a user interface for the graphical program, the number or degree of comments contained within the graphical program, etc.

In response to receiving the information in step 208, the GPG program may process the information in order to determine how to generate the graphical program, i.e., in order to determine appropriate graphical source code for the program, an appropriate user interface for the program, etc. As described below, the determination of how to generate the graphical program may depend on a combination of the received information and/or the program logic of the GPG program (i.e., what the GPG program is operable to do with the received information).

In generating the determined graphical program, the GPG program may specify the inclusion of various objects in the new graphical program. For example, the new graphical program may have a diagram portion including a plurality of interconnected nodes which visually indicate functionality of the new graphical program. The new graphical program may also have a user interface portion including various user interface objects, such as one or more user interface panels having controls for specifying user input to the graphical program and/or indicators for displaying output from the graphical program. The GPG program may also specify other aspects of the graphical program, such as: interconnections between diagram objects, connections between diagram objects and user interface objects, positions of objects, sizes of objects, and properties or configuration of objects (e.g., configuration of data types, parameters, etc.), among other aspects of the graphical program.

In various embodiments, the GPG program may generate a graphical program of any of various types. For example, the GPG program may generate the graphical program specifically so that a particular graphical programming development environment is operable to edit and/or execute the graphical program.

In one embodiment, the GPG program may be a self-contained program that includes all executable logic necessary for programmatically generating the new graphical program. However, in the preferred embodiment, the GPG program utilizes a client/server programming model, in which the client portion processes the program information and determines the graphical program to be generated based on the program information (i.e., determines the function nodes or other objects to be included in the program, the interconnections among these nodes/objects, etc.). The client portion may then call an API provided by the server portion to request the server portion to perform the actual creation of the new graphical program, e.g., by creating files and/or other data structures representing the new graphical program. The server portion may execute on the same computer system as the client portion or may execute on a different computer system, e.g., a different computer system connected by a network. In one embodiment, the server portion may be an instance of a graphical programming development environment application, which provides an API enabling client programs to programmatically create and/or edit graphical programs.

The method of FIG. 4 is illustrated and is described above in terms of generating a new graphical program. It is noted that a similar method may be used to modify an existing graphical program, e.g., in order to add functionality to the program, such as functionality specified by user input received by a user interface wizard. In other words, instead of specifying creation of a new graphical program, the GPG program may specify the modification of an existing graphical program. When executed, the GPG program is then operable to programmatically modify the existing graphical program. For example, the GPG program may include a reference to the existing graphical program and may perform various API calls to modify the graphical program, e.g., by adding one or more objects to the graphical program, changing connections between graphical program objects, changing various properties of graphical program objects, etc.

It is noted that FIG. 4 represents one embodiment of a method for programmatically generating a graphical program, and various steps may be added, reordered, combined, omitted, modified, etc. For example, as described above, the GPG program may include or may be associated with an application that the user uses to specify the program information. For example, such an application may enable the user to specify a state diagram, a test executive sequence, a prototype, etc., on which to base the graphical program. Thus, executing the GPG program in step 206 may comprise invoking a routine or program associated with this application, e.g., in response to the user selecting a menu option included in the application's user interface. In other embodiments, the user may launch the GPG program as an independent application.

Figure 5:
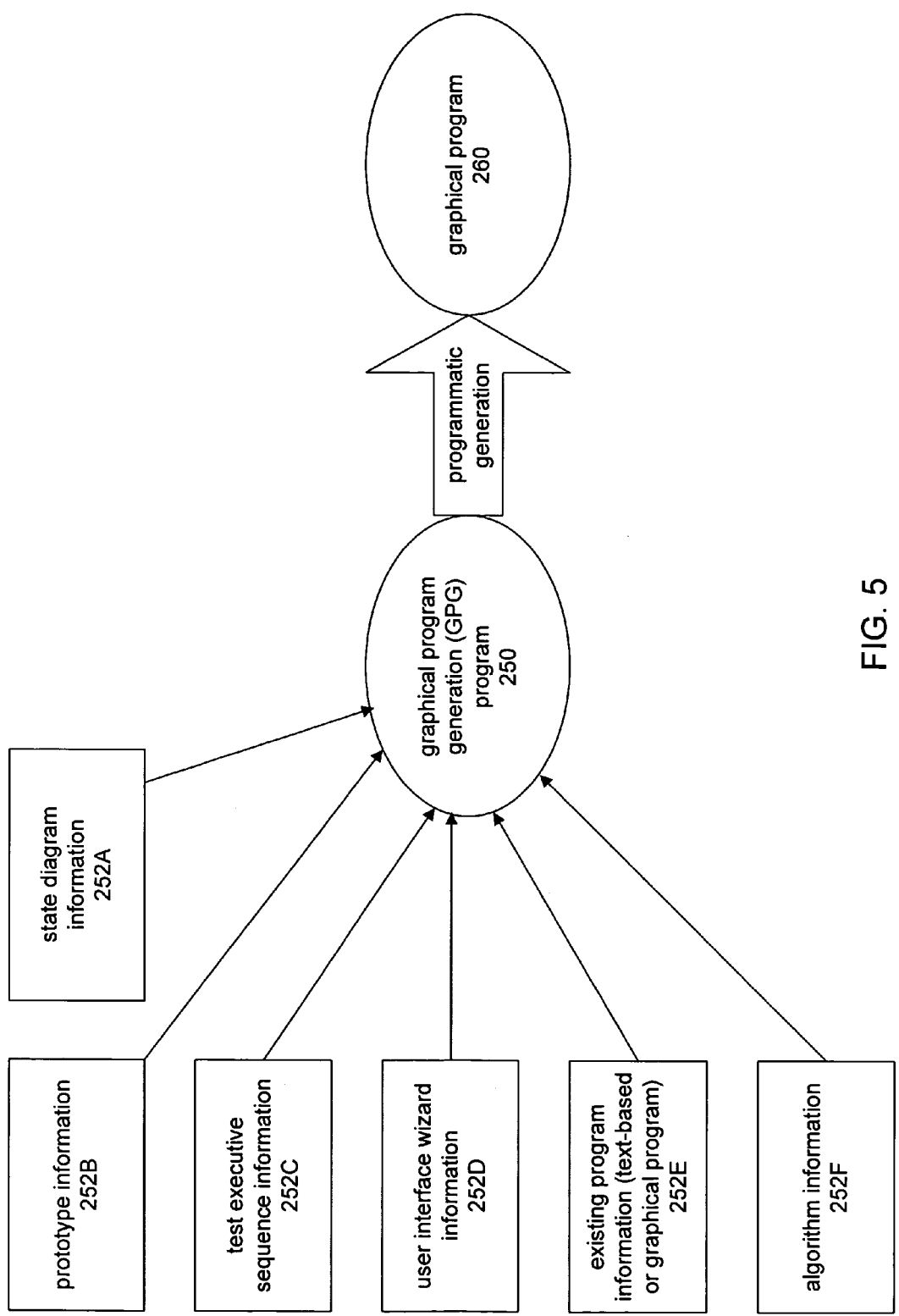
FIG. 5 is a block diagram illustrating that a "GPG program" which programmatically generates a graphical program may be a program for any of various purposes and may receive information of any type to use in generating the graphical program.

FIG. 5—Examples of GPG Programs and Received Information

FIG. 5 is a block diagram illustrating that the GPG program may be a program for any of various purposes and may receive information of any type to use in generating a graphical program. FIG. 5 illustrates a GPG program 250 and various types of program information 252 that the GPG program may receive.

In some embodiments, the GPG program 250 may include or be coupled with a program or application which a user utilizes to construct or characterize a computational process. In response to the specified computational process, the GPG program 250 may programmatically generate a graphical program to implement the computational process.

For example, a state diagram editor may be used to construct a state diagram characterizing a computational process, e.g., in response to user input. As shown in FIG. 5, the GPG program 250 may then receive state diagram information 252A and use this state diagram information to programmatically generate the graphical program. For example, the programmatically generated graphical program may implement functionality specified by the state diagram created by the user.

As another example, the GPG program 250 may include or be coupled with a program or application which a user utilizes to construct a prototype, e.g., in order to characterize an algorithm at a high level. The constructed prototype may be represented as prototype information 252B. In this case, the GPG program 250 may then programmatically generate a graphical program that implements the prototype, based on the prototype information 252B. For more information on programmatically generating a graphical program to implement a prototype, please see U.S. patent application Ser. No. 09/595,003, incorporated by reference above.

As another example, the GPG program 250 may include or be coupled with a program or application which a user utilizes to construct a test executive sequence, e.g., to perform a series of tests on a unit under test. In this case, the GPG program 250 may then programmatically generate a graphical program operable to perform the series of tests when executed, based on test executive sequence information 252C.

In other embodiments, the GPG program 250 may be associated with a program or application that directly aids the user in creating a graphical program. For example, the GPG program 250 may be associated with a graphical programming development environment application. In this case, the GPG program 250 may be operable to receive user input specifying desired functionality, indicated as user interface wizard information 252D in FIG. 5, and may automatically, i.e., programmatically, add a portion of graphical program code implementing the specified functionality to the user's program. For example, the user interface wizard information 252D may be received via one or more "wizard" user interface dialogs enabling the user to specify various options. Such graphical program code generation wizards may greatly simplify the user's task of implementing various operations. As an example, it is often difficult for developers of instrumentation applications to properly implement code to analyze an acquired signal, due to the inherent complexity involved. By enabling the developer to specify the desired functionality through a high-level user interface, the developer can quickly and easily create graphical code to implement the signal analysis. Furthermore, since the graphical code is generated programmatically, the code may be optimized, resulting in an efficient program and a readable block diagram without unnecessary code.

In other embodiments, the GPG program 250 may be operable to automatically translate an existing program into a graphical program. The GPG program may examine the existing program and programmatically generate a graphical program. In one embodiment, the GPG program may include or interface with different front-end plug-in modules, wherein each plug-in module is operable to analyze a particular type of program, e.g., a program written in a particular language or used by a particular development environment, and generate existing program information 252E usable by the GPG program for creating a graphical program that implements functionality of the existing program. The programmatically generated graphical program may perform the same, or substantially the same functionally as, or a subset of the functionality of the existing program.

In one embodiment, the existing program may be a text-based program, such as a C program. In another embodiment, the existing program may itself be a graphical program. For example, although graphical programs created using different graphical programming development environments are similar in some respects, the graphical programs typically cannot be easily transferred across different graphical programming environments for editing or execution. For example, different graphical programming development environments provide different nodes for inclusion in a block diagram, store program files in different formats, etc. Thus, if an existing graphical program associated with one programming environment is desired to be ported to a new programming environment, the GPG program may examine the existing graphical program (or may examine abstract information specifying the existing graphical program) and may programmatically generate a new graphical program associated with the new programming environment.

In another embodiment, the GPG program 250 may be operable to automatically generate a graphical program in response to algorithm information 252F.

In addition to the examples given above, a GPG program 250 may receive any other type of information and programmatically generate a graphical program based on the received information.

It is noted that, in various embodiments, the GPG program 250 may receive the information 252 used in generating the graphical program in any of various ways. The information may be received from the user, from another program, or from other sources, such as a file or database. The information may comprise information of any type, including text or binary information structured in any of various ways. The information may be self-describing, and/or the GPG program may include knowledge of how to interpret the information in order to generate the appropriate graphical program.

As an example, consider a state diagram editor application usable for constructing a state diagram. In this example, the GPG program may be or may be included in the state diagram editor application itself. For example, the state diagram editor application may receive user input specifying state diagram information. The state diagram editor application may then programmatically generate a graphical program to implement functionality specified by the state diagram information, e.g., in response to the user selecting a menu option to generate the graphical program. In other embodiments, the GPG program may be separate from the state diagram editor application. For example, when the user selects the menu option to generate the graphical program, the state diagram editor application may provide the state diagram information to another application, i.e., the GPG program, which then generates the graphical program based on this information. In another embodiment, a user may invoke the GPG program separately and request the GPG program to generate a graphical program, e.g., by specifying a state diagram file. The GPG program may receive the state diagram information in any of various ways formats, e.g., as binary data, XML data, etc.

In most of the examples given above, functionality of the graphical program to be generated is specified explicitly by the received information. For example, a state diagram, user input specified via a wizard interface, a prototype, a test executive sequence, and an existing program, all explicitly specify, to varying degrees, functionality which the graphical program should implement.

It is noted that in other embodiments the received information by itself may not explicitly or inherently specify functionality of the graphical program to be generated. In a case such as this, the functionality of the generated graphical program may be determined mainly by the GPG program. Thus, one embodiment may include different "types" of GPG programs, wherein each type of GPG program is configured to generate graphical programs of a certain type. For example, consider two different GPG programs, program A and program B, which are both operable to retrieve numeric data from a database and create a graphical program based on the numeric data. Program A may be operable to create a graphical program which, when executed, displays a user interface to visually graph the numeric data. For example, program A may receive user input specifying various display options desired and may programmatically generate the graphical program such that the graphical program is operable to display the numeric data as specified by the user. Program B, on the other hand, may be operable to create a graphical program which, when executed, performs a statistical analysis of the data and displays the result of the analysis. For example, program B may receive user input specifying various analysis options desired and may programmatically generate the graphical program such that the graphical program is operable to analyze the numeric data as specified by the user. Thus, in these examples, the functionality of the graphical program is determined mainly by the GPG program that generates the graphical program, and only determined to a small degree by the received information.

Thus, in various embodiments, the functionality of the graphical program may be determined by the received program information, and/or the GPG program, and/or possibly also in response to user input received by the GPG program. In some cases the functionality may be specified almost entirely by the received information. For example, in a case where the GPG program programmatically translates an existing program to a new graphical program, the functionality of the new graphical program may be specified entirely by the existing program. In other cases, the received information and the GPG program may each determine a portion of the functionality. For example, in a case where the GPG program generates a graphical program to implement a test executive sequence, the test executive sequence information may determine the body of the program which includes the code for executing the tests, but the GPG program may be operable to add additional functionality to the graphical program, e.g., by adding code operable to prompt the user for a log file and save test results to the log file, code to display a user interface indicating the current unit under test and the current test being performed, etc.

In a typical case, the implementation of the graphical program code is determined mainly or entirely by the GPG program, although the received information may influence the manner in which the GPG program generates the code, or the GPG program may receive separate information influencing the code generation. For example, consider a GPG program operable to translate an existing graphical program to a new graphical program, e.g., in order to port the existing graphical program to a new programming environment. In one embodiment, the GPG program may be operable to generate the new graphical program in such a way as to match the existing graphical program as closely as possible in appearance. In other words, the new graphical program may be generated so that when the user sees the block diagram of the new graphical program, the block diagram appears substantially the same as the block diagram of the existing graphical program, e.g., in terms of the layout and connections among the block diagram nodes. In another embodiment, the GPG program may be operable to implement the new graphical program differently, e.g., by optimizing the code where possible. In this example, the functionality of the generated graphical program may be the same in either case, but the graphical program may be implemented in different ways.

The GPG program may also receive input specifying how to implement the graphical program. For example, in the case above, the user may specify whether or not to perform optimizations when translating an existing graphical program. For example, the new programming environment may support downloading the generated graphical program to a hardware device for execution. If the user desires to download the generated graphical program to a hardware device, e.g., for use in a real-time application, then it may be important to optimize the new program. Otherwise, it may be more important to implement the generated graphical program similarly as the existing graphical program is implemented.

In one embodiment, the GPG program may provide extended support for specifying graphical program code implementation, beyond the ability to specify simple options. For example, the GPG program may support plug-ins specifying code generation information for various cases. Referring again to the program translation example above, each plug-in may specify how to generate code intended for execution on a particular hardware device. For example, if the generated program is to be run on an FPGA, the generation of the code may be optimized depending on the number of gates available on that particular FPGA.

In various embodiments, an association between a generated graphical program and the received program information used in generating the graphical program may be maintained. For example, this association may enable a user to execute the automatically generated program and then return to an application from which the program information originates, e.g., in order to view or edit the program information. For example, consider a prototyping environment application which enables a user to develop a prototype characterizing an algorithm. The prototyping environment application may programmatically generate a graphical program implementing the developed prototype. The user may then execute the graphical program, and if a problem with the program is discovered, the association may enable the user to return to the prototyping environment application in order to view or modify the prototype used to generate the program. In one embodiment, a generated program may be "locked", requiring the user to explicitly unlock the program before the program can be modified within the graphical programming environment. Locking the program may facilitate the retrieval or recreation of the program information that was used to generate the program.

In various embodiments, the GPG program may be operable to generate any of various types of graphical programs. For example, as discussed above, a generated graphical program may be targeted toward a particular graphical programming development environment application, e.g., to utilize proprietary features or to create files that are formatted in a manner expected by the graphical programming development environment. Examples of graphical programming development environments include LabVIEW, BridgeVIEW, DasyLab, and DiaDem from National Instruments, VEE from Hewlett Packard, Simulink from The MathWorks, Softwire from Measurement Computing, Inc., Sanscript from Northwoods Software, WiT from Coreco, and Vision Program Manager from PPT Vision, among others.

In various embodiments, the graphical program may be generated using any of various methods or techniques. Generating the graphical program may comprise generating one or more files defining the graphical program. When a user interactively develops a graphical program from within a graphical programming environment, the graphical programming environment may create one or more program files. For example, the program files may specify information such as a set of nodes that the graphical program uses, interconnections among these nodes, programmatic structures such as loops, etc. In other cases, the program files may store various data structures, e.g., in binary form, which the graphical programming environment uses to directly represent the graphical program. Thus, in programmatically generating the graphical program, the GPG program may programmatically generate one or more files representing the graphical program, wherein these files are structured or formatted appropriately for a particular graphical programming environment.

In various cases, a graphical program generated by a GPG program in response to program information may be a fully working program. Thus, the user may load the generated graphical program into the graphical programming environment, execute the program, etc. In other cases, the generated graphical program may not be a complete program. As an example, if an existing program is translated to a graphical program, it may not be possible to translate the entire program. For example, the existing program may utilize functions which do not exist in the graphical programming environment to which the program is to be ported. However, the GPG program may still create a partial graphical program, making it relatively easy for the user to complete the graphical program. In still other cases, it may be desirable to programmatically generate only a graphical code portion, e.g., as discussed above in the case of user interface wizard tools that aid the user in program development.

Figure 6:
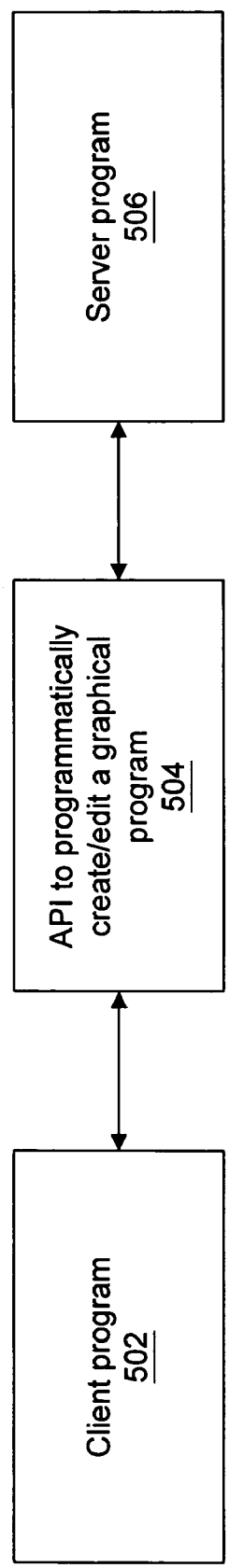
FIG. 6 is a block diagram illustrating the abstract relationship between a client program (a GPG program), an API to programmatically generate/edit a graphical program, and a server program.

FIG. 6—GPG Program Accesses Server Program Through an API

As described above, in one embodiment, the GPG program may be implemented as a client program and a server program, wherein the server program may provide an application programming interface (API) which the client program can use to programmatically generate the graphical program. One embodiment of such a client/server implementation of a GPG program is described below.

For each node, user interface element, or other object of the graphical program, the client program may call the API to programmatically add the object to the graphical program, connect the object to other objects of the graphical program, etc. Any necessary files or other constructs needed by the graphical programming environment in order to use the generated graphical program may be automatically created by the server program as a result of calling the API.

FIG. 6 is a block diagram illustrating the abstract relationship between a client program 502, an API 504 to programmatically create/edit a graphical program, and a server program 506. It is noted that the API block represents the abstract notion of the API presented by the server program 506, and in various embodiments the API block 504 may not represent any actual code. Also, in actual embodiments, various layers may exist which implement the elements of the FIG. 6 relationship. For example, the client program 502 may be a part of a larger software application, the server program 506 may receive information sent by the client program 502 via an intermediate server, etc.

As noted above, the client program 502 may be any of various types of programs. For example, the client program 502 may be a graphical program. The client program 502 may also be a text-based program such as a C++ program, a Visual Basic program, a JAVA program, etc., or any combination of these or other languages. The client program 502 may execute independently or may execute within an execution subsystem of an application development environment.

The client program 502 may call the API 504 in any of various ways. For example, a client graphical program may include graphical nodes corresponding to the API 504. One embodiment of a set of graphical nodes which a client graphical program may utilize to create/edit a graphical program is described in detail below. A client graphical program may also interface with text-based code which calls the API 504.

The client program 502 may also call the API 504 in various other ways. For example, the server program 506 may expose a component such as an ActiveX component, CORBA component, JavaBeans component, etc., and the client program 502 may obtain a reference to the object to invoke functions or methods of the API 504. The API 504 may also be integrated with the language or development environment of the client program 502, e.g. as a library.

Through the API 504, the client program 502 may communicate with the server program 506. The server program 506 is operable to perform the actions indicated by the API calls. For example, the server program may be operable to create a new graphical program, add objects to the graphical program, connect graphical program objects, etc. The server program 506 is preferably an instance of a graphical programming environment. In one embodiment, the server program 506 is an instance of the LabVIEW graphical programming environment. One particular embodiment of the server program 506 is described below.

In one embodiment, the server program 506 is the same regardless of the type of information (e.g., 252A–252F) that is received. Typically, the client program 502 will be different (or will use a different plug-in) based on the type of information, e.g. 252A–252F. Also, it is noted that the GPG program may be considered to be only the client program 502, wherein in this instance the GPG program 502 simply uses the services of a separate server program.

Graphical API

The server program 506 of FIG. 6 may be operable to receive requests to generate/edit a graphical program from a client program 502 and perform the actual operations of creating/editing the graphical program. Thus, in the preferred embodiment, the client program 502 includes program logic for processing received program information and determining the structure of a graphical program to be generated based on the received program information, and the client program calls the server program to perform the generation of the graphical program (or to perform a modification to an existing graphical program).

In one embodiment, the server program 506 of FIG. 6 is an application instance of the LabVIEW graphical programming environment. As noted above, the LabVIEW environment provides specialized support for developers of instrumentation and industrial automation applications, and a LabVIEW graphical program may be referred to as a virtual instrument or VI. The LabVIEW environment comprises functionality referred to as "VI Server" which enables client programs to communicate with the LabVIEW environment. The VI Server functionality enables client programs to create or edit a LabVIEW graphical program or VI.

A client program which requests LabVIEW to generate/edit a VI may itself be a graphical program or VI. A client VI may include particular nodes in the client VI block diagram which utilize the VI Server functionality of a LabVIEW instance to request the LabVIEW instance to obtain information of an existing VI, create a new VI, add objects to the VI, etc. These nodes are described below with reference to FIGS. 7–17, and FIGS. 21–23 illustrate exemplary uses of these nodes. (LabVIEW also provides components such as ActiveX components which enable text-based programs such as Visual Basic programs, Visual C++ programs, etc. to access the VI Server functionality. In the preferred embodiment, these components enable text-based programs to perform all of the functions described below.)

FIGS. 7–17: Client Graphical Program Nodes

Figure 7:
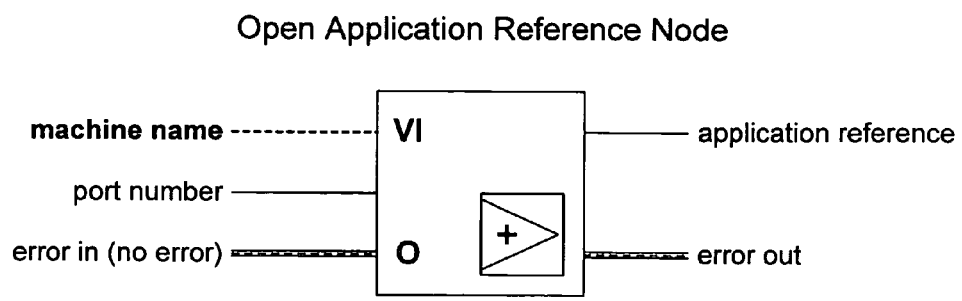
FIGS. 7–17 illustrate graphical program nodes that may be included in a graphical GPG program in order to programmatically generate or modify a graphical program.

FIG. 7—Open Application Reference Node

FIG. 7 illustrates the Open Application Reference node. A client VI may include the Open Application Reference node to obtain a reference to a VI Server application running on the specified computer. If an empty string is specified for machine name, then the node returns a reference to the local LabVIEW application in which this function is running. If a machine name is specified, then the node attempts to establish a TCP connection with a remote VI Server on that machine on the specified port.

The application reference output can be used as an input to the Property and Invoke nodes described below to get or set properties and invoke methods on the application. The application reference output is used as the input to the Open VI Reference function to obtain references to VIs in that application. The reference is closed with the Close Application or VI Reference function. If the user forgets to close this reference, the reference closes automatically when the top level VI associated with this function finishes executing. However, closing the reference operates to conserve the resources involved in maintaining the connection.

The following describes the inputs and outputs of the Open Application Reference node:

machine name is the address of the computer that runs a copy of LabVIEW to which it is desired to establish a connection. This address can be in dotted decimal notation (such as 130.164.15.250) or domain name notation (such as foo.natinst.com). An empty string will cause this function to return a reference to the local LabVIEW. The machine name input enables client programs to communicate with a VI Server instance running on any computer connected to the Internet.

port number is the port on which the remote LabVIEW application is listening. If port number is not wired, the default VI Server listener port number (e.g., 3363) is used.

error in describes error conditions that occur prior to the execution of this function. The default input of this cluster is "no error". If the error Boolean of this cluster is True, the Open Application Reference function will do nothing but pass through the error via the error out output.

application reference is the reference to the specified application.

error out contains error information. If error in indicates an error, error out contains the same error information. Otherwise it describes the error status that this function produces.

Figure 8:
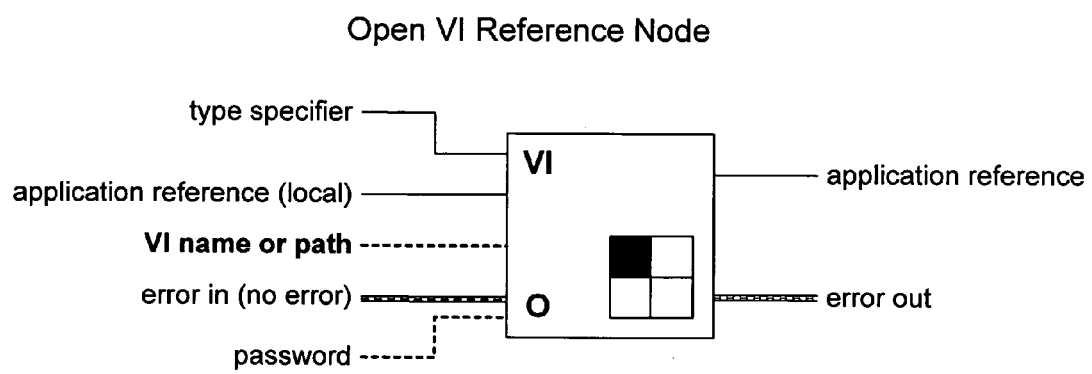

FIG. 8—Open VI Reference Node

FIG. 8 illustrates the Open VI Reference node. The Open VI Reference node returns a reference to a VI specified by a name string or path to the VI's location on disk. This reference may then be used to edit the VI. In the current embodiment, references can only be obtained to standard VIs. This excludes Control, Typedef, and Global VIs. In the preferred embodiment, the Open VI Reference node can be used to obtain a reference to any VI.

References to VIs in another LabVIEW application are obtained by wiring an application reference (obtained from the Open Application Reference function) to this function. In this case, the path input refers to the file system on the remote LabVIEW computer. If a reference to the local LabVIEW application is wired the same behavior is obtained as if nothing had been wired to the application reference input.

If editing operations are to be performed on the referenced VI, and the VI has a password-protected diagram, the password is provided to the password string input. If the incorrect password is provided, the Open VI Reference function returns an error and an invalid VI reference. If no password is provided when opening a reference to a VI that is password protected, the reference can still be obtained, operations can only be performed that do not edit the VI.

If the specified VI is to be called through the Call By Reference function, a strictly-typed VI reference is wired to the type specifier input. The function ignores the value of this input. Only the input's type—the connector pane information—is used. By specifying this type, the Open VI Reference function verifies at run time that the referenced VI's connector pane matches that of the type specifier input.

If a Generic VI refnum type is wired to the type specifier input, this results in the same behavior as if the type specifier input had not been wired at all.

If the type specifier input is wired with a strictly-typed VI refnum, the VI must meet several requirements before the VI reference is returned successfully:

1) The VI cannot be broken for any reason.
2) The VI must be runnable as a subVI, that is, it cannot be active as a top-level VI (unless the VI is re-entrant).
3) The connector pane of the VI must match that of the type specifier.

If the user forgets to close this reference using a close reference node, the reference closes automatically when the top-level VI associated with this function finishes executing. However, closing the reference operates to conserve the resources involved in maintaining the connection.

If a strictly-typed reference to a reentrant VI is obtained, a dedicated data space is allocated for that reference. This data space is preferably always used and is used only in conjunction with the output VI reference. This can lead to some new behaviors in LabVIEW. For example, parallel calls (using the Call By Reference node) to a reentrant VI using the same VI reference do not execute in parallel, but executes serially, one after the other. As another example, a reentrant VI could get a reference to itself (allocating a new data space) and call itself recursively through the Call By Reference node. It is noted that allocating a data space dynamically is both time consuming and memory consuming and is not generally recommended for implementing recursive algorithms.

A VI reference is similar to what is known as a function pointer in other languages. However, in LabVIEW, these function pointers also can be used to reference VIs across a network.

The following describes the inputs and outputs of the Open VI Reference node:

application reference is a reference to a LabVIEW application. If this input is left unwired, the reference is to an application on the local version of LabVIEW. If the input is wired, and the reference is to a remote version of LabVIEW, then the remote LabVIEW is queried to return the VI reference.

type specifier is used for its data type only. The value of the input is ignored. The data type of the type specifier input determines the data type of the vi reference output.

VI name or path is polymorphic and can accept a string containing the name of the desired VI, or a path containing the complete path (including the name) to the desired VI. If a name string is wired, then the VI must already be in memory. If a path is wired and the VI is already in memory, the VI in memory is obtained, whether its path is the same as the input or not. If the VI is not in memory, then the VI must be at the specified path for this function to succeed. If the VI is at that location, the VI is loaded into memory.

error in describes error conditions that occur prior to the execution of this function. The default input of this cluster is no error.

password is the plain-text password string for the VI. If the VI is not password protected, the input is ignored. If the VI is password protected and an incorrect password is entered, the VI can be referenced, but the VI cannot be edited through that VI reference.

vi reference is the refnum associated with the requested VI. If the function fails, "not-a-refnum" is returned.

error out contains error information. If error in indicates an error, error out contains the same error information. Otherwise error out describes the error status that this VI produces.

If the user specifies a remote version of LabVIEW by the application reference input, the path is interpreted on the remote machine in the context of the remote file system. The path is expressed using the local computer's path separators, but is translated to the remote computer's path separators when the request arrives there. For example, to reference a VI on a Macintosh at My HD:LabVIEW VIs:foo.vi from a Windows application, the Window's path syntax: My HD:\LabVIEW VIs\foo.vi would be used. Conversely, to reference a VI on a Windows computer at C:\labview\foo.vi from a Macintosh application, the Macintosh path syntax: C:labview:foo.vi would be used.

Figure 9:
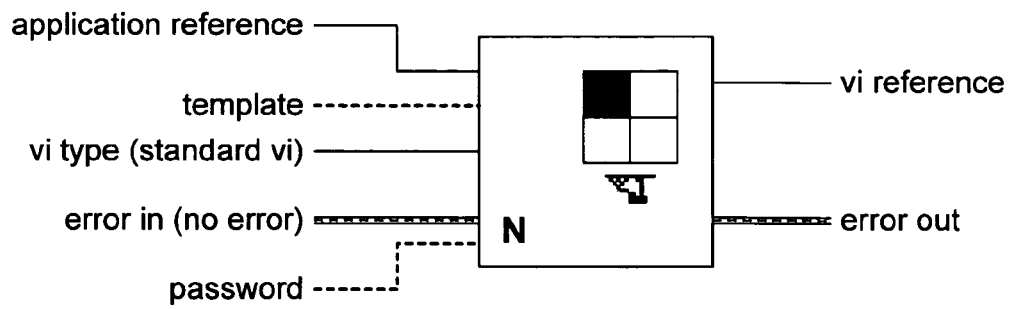

FIG. 9—New VI Reference Node

FIG. 9 illustrates the New VI Reference node. The New VI Reference node creates a new VI and outputs a reference to the new VI. The following describes the inputs and outputs of the New VI Reference node:

application reference is an input reference to a local or remote LabVIEW application. Such a reference may be obtained from the Open Application Reference node. If this input is left unwired, the reference is to an application on the local version of LabVIEW.

template is a path of or reference to an existing VI to be used as a template for the new VI. If the template input is wired, the new VI will be a copy of the template VI.

vi type specifies the type of VI to create. The possible types are: standard VI, global VI, or control VI.

error in describes error conditions that occur prior to the execution of this function. The default input of this cluster is no error.

password is the password input for the template VI, if a password-protected VI is wired to the template input. If the template VI is not password protected, the password input is ignored.

vi reference is the refnum associated with the newly created VI. If the function fails, "not-a-refnum" is returned.

error out contains error information. If error in indicates an error, error out contains the same error information. Otherwise error out describes the error status that this node produces.

Figure 10:
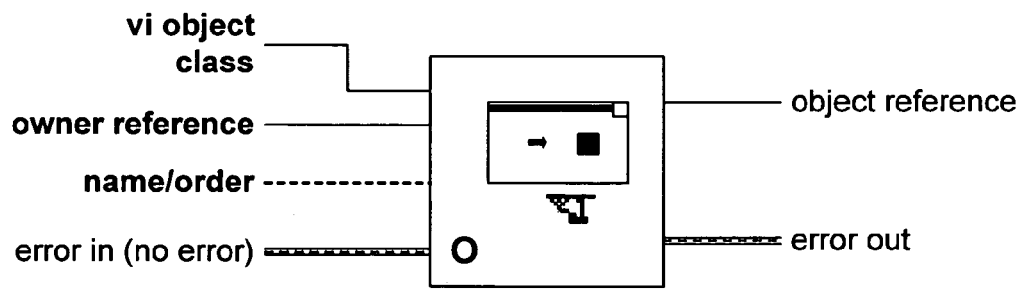

FIG. 10—Open VI Object Reference Node

FIG. 10 illustrates the Open VI Object Reference node. The Open VI Object Reference node outputs a reference to an object contained in a VI. The following describes the inputs and outputs of the Open VI Object Reference node:

vi object class specifies the type of object reference to obtain. References to both objects of a front panel (user interface panel) and of a block diagram may be obtained. FIG. 19 illustrates how a user may choose a value for the vi object class input by selecting from a hierarchical menu. For example, a "slide" value may be chosen to designate that the reference to obtain is a reference to a slide user interface control.

owner reference is an input reference to the object that "owns" or "contains" the object for which a reference is to be obtained. The owner reference may be a reference to a VI or to an object within a VI. For example, the owner reference may be a reference to a block diagram node, and the reference to be obtained may be a reference to an input terminal of the block diagram node.

name/order identifies the name or order, e.g. zplane order, of the object for which to obtain a reference. The name/order input may be a simple string, an array of strings, or a numeric constant. An array of names may be used if the object is a nested object. For example, to access the status boolean of an error cluster in an array called "myArray", the name array may be: ["myArray", NULL, "status"].

error in describes error conditions that occur prior to the execution of this function. The default input of this cluster is no error.

object reference is an output reference to the object specified by the node inputs. If the function fails, "not-a-refnum" is returned.

error out contains error information. If error in indicates an error, error out contains the same error information. Otherwise error out describes the error status that this node produces.

Figure 11:
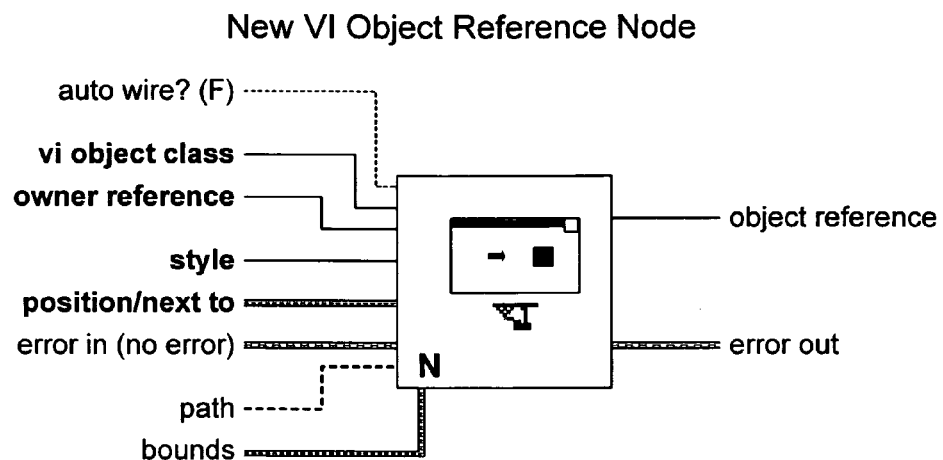

FIG. 11—New VI Object Reference Node

FIG. 11 illustrates the New VI Object Reference node. The New VI Object Reference node creates a new VI object and outputs a reference to the new VI object. The following describes the inputs and outputs of the New VI Object Reference node:

auto wire is a boolean input specifying whether to automatically wire the terminals of the new object with compatible terminals of a source object. This input is only applicable for diagram objects, not user interface objects. If this input is wired, then the position/next to input should also be wired.

vi object class specifies the type of object to create. Both objects for a front panel (user interface panel) and for a block diagram may be created. FIG. 19 illustrates how a user may choose a value for the vi object class input by selecting from a hierarchical menu. For example, a "slide" value may be chosen to designate that the reference to obtain is a reference to a slide user interface control.

owner reference is a reference to the VI or VI object that will "own" or "contain" the new object. For example, the owner may be the VI, and the new object may be a new function node to add.

style specifies the style or sub-class of object to create. FIG. 20 illustrates how a user may choose a value for the style input by selecting from a hierarchical menu. For example, if "slide" is chosen as the vi object class input, then "vertical pointer slide" may be chosen for the style input. The style input is ignored if the path input is wired.

position/next to specifies a position for the new object. An X-Y coordinate pair may be wired to this input, or a reference to an existing object may be wired. If an object reference is wired in, then the new object is positioned next to the referenced object.

error in describes error conditions that occur prior to the execution of this function. The default input of this cluster is no error.

path specifies the location of a user control/VI.

bounds specifies the size of the new object. The bounds input is ignored for fixed-size objects.

Figure 12:
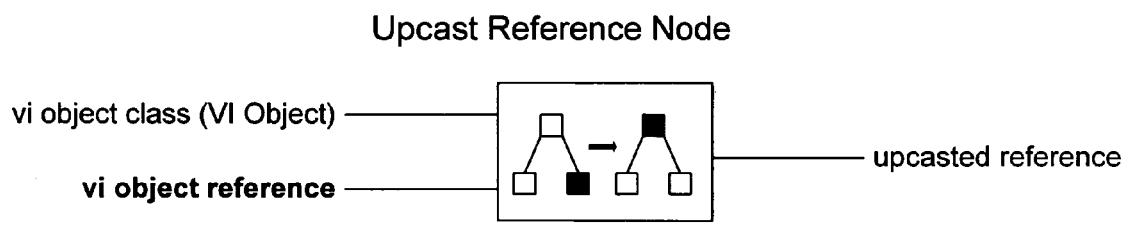

FIG. 12—Upcast Reference Node

FIG. 12 illustrates the Upcast Reference node. The Upcast Reference node casts the type of a reference to an object to the type of a superclass for the object. The following describes the inputs and outputs of the Upcast Reference node:

vi object reference specifies a VI object reference to upcast.

vi object class specifies a class to cast the object reference to. FIG. 19 illustrates how a user may choose an object class from a hierarchical menu. For example a reference to a vertical pointer slide object may be upcasted to a reference to a general slide object.

upcasted reference is an output reference with the specified class as the reference type information. If the up cast fails, "not-a-refnum" is the output value.

Figure 13:
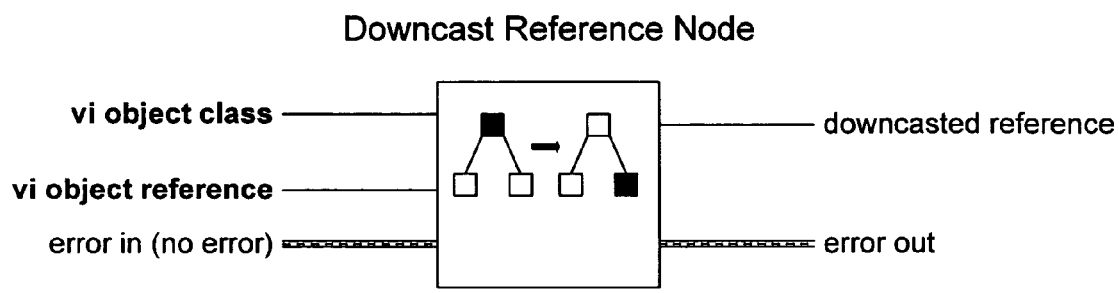

FIG. 13—Downcast Reference Node

FIG. 13 illustrates the Downcast Reference node. The Downcast Reference node casts the type of a reference to an object to the type of a subclass. The following describes the inputs and outputs of the Downcast Reference node:

vi object reference specifies a VI object reference to downcast.

vi object class specifies a class to cast the object reference to. FIG. 20 illustrates how a user may choose a class from a hierarchical menu. For example a reference to a general slide object may be downcasted to a reference to a vertical pointer slide object.

error in describes error conditions that occur prior to the execution of this function. The default input of this cluster is no error.

downcasted reference is an output reference with the specified class as the reference type information. If the downcast fails, "not-a-refnum" is the output value.

error out contains error information. If error in indicates an error, error out contains the same error information. Otherwise error out describes the error status that this node produces.

Figure 14:
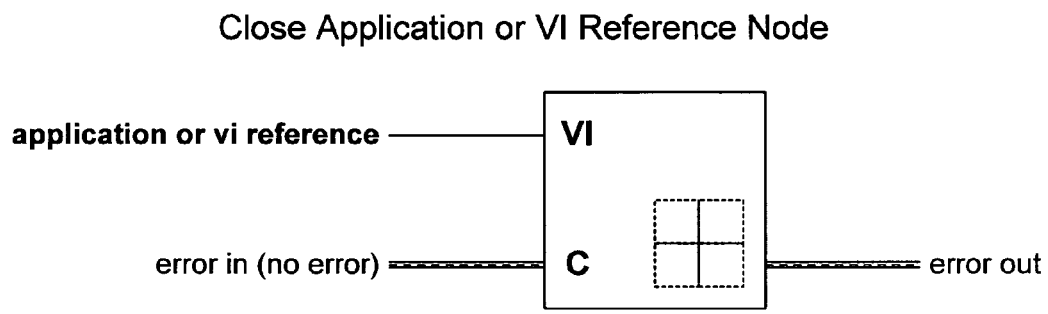

FIG. 14—Close Application or VI Reference Node

FIG. 14 illustrates the Close Application or VI Reference node. The Close Application or VI Reference node closes an open VI or the connection to a LabVIEW application instance. The following describes the inputs and outputs of the Close Application or VI Reference node:

application or vi reference is the refnum associated with an open VI or a LabVIEW application instance.

error in describes error conditions that occur prior to the execution of this function. The default input of this cluster is no error.

error out contains error information. If error in indicates an error, error out contains the same error information. Otherwise it describes the error status that this node produces.

Figure 15:
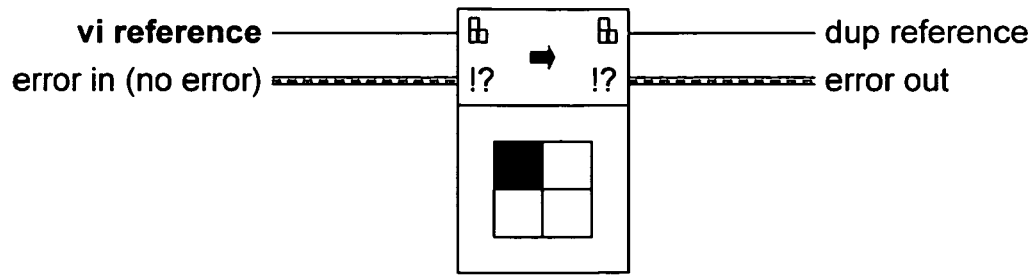

FIG. 15—Call By Reference Node

FIG. 15 illustrates the Call By Reference node. The Call By Reference node may be used to call a VI, such as a VI which has been created programmatically. The Call By Reference node is similar to a sub-VI node in that either can be used to call a VI. However, a sub-VI node is statically linked to a particular VI that the user determines when he/she drops the node on the diagram. With the Call By Reference node, the VI that is called is determined dynamically at run time by the value of the VI reference wired to the reference input at the top of the node. Thus, the VI which is called by the Call By Reference node may be on a different computer.

The top of the Call By Reference node includes four terminals: an input/output pair of flow through VI reference terminals, and an input/output pair of flow through error clusters. The VI reference input accepts wires only from strictly-typed VI references. Below these terminals is an area within which a connector pane resides (is displayed) that is identical to that of a VI with its terminals showing (rather than its icon). The connector pane of the strictly-typed VI reference input determines the pattern and data types of this connector pane which is displayed in the Call By Reference node icon. The user wires to these terminals just as he/she would to a normal sub-VI.

As long as none of the terminals of the connector pane have wires attached to them, the connector pane will adapt automatically to that of the input VI reference's connector pane. However, if any of them are wired, the node does not adapt automatically, and the user must explicitly change the connector pane (possibly breaking those wires) by popping up on the node and selecting the Adapt To Reference Input menu item.

At run time there is a small amount of overhead in calling the VI that is not necessary in a normal sub-VI call. This overhead comes from validating the VI reference and a few other bookkeeping details. However, for a call to a VI in the local LabVIEW, this overhead should be insignificant for all but the smallest subVIs. Calling a VI located in another LabVIEW application (across the network) may involve more overhead.

The following describes the inputs and outputs of the Call By Reference node:

vi reference is the refnum associated with a VI that is already open.

error in describes error conditions that occur prior to the execution of this function. The default input of this cluster is no error.

dup reference has the same value as reference.

error out contains error information. If error in indicates an error, error out contains the same error information. Otherwise, it describes the error status that this VI produces.

Figure 16:
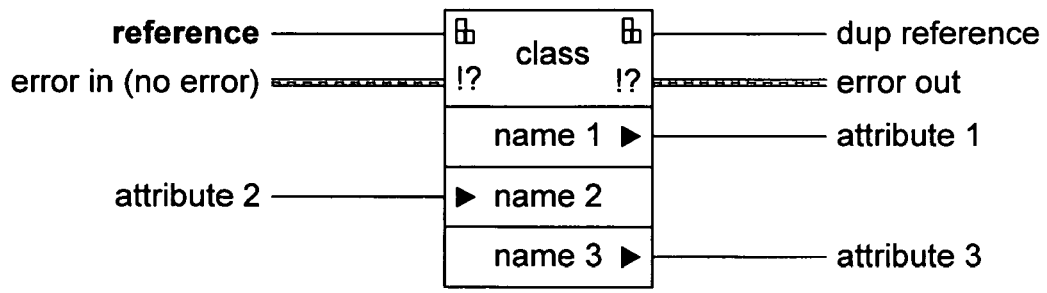

FIG. 16—Property Node

FIG. 16 illustrates the Property node. The Property node sets (writes) or gets (reads) application, VI and VI object property information. Thus, the Property node may be used to create/edit a graphical program. For example, the property node may be used to change the color of a user interface object, etc.

To select a specific property, the user pop ups on one of the name terminals and selects Properties. The list of available properties to select from may depend on the type of object wired to the reference input. To set property information, the user pop ups and selects Change to Write. To get property information the user pop ups and selects Change to Read. Some properties are read only, so Change to Write cannot be seen in the popup menu. If the user desires to add items to the node, the user pop ups and selects Add Element or clicks and drags the node to expand the number of items in the node. The properties are changed in the order from top to bottom. If an error occurs on one of the properties, the node stops at that property and returns an error. In this case, no further properties are handled. The error string reports which property caused the error. If the small direction arrow on a property is on the left, then the property value is being set. If the small direction arrow on the property is on the right, the user is getting the property value. Each property name has a short or long name which can be changed by popping up and selecting Name Format. Another name format is no name where only the type is displayed for each property.

The Property node may be used to access or affect a number of different properties, including VI (virtual instrument) and application properties.

The inputs and outputs of the Property node are described below.

reference is the refnum associated with a VI object, VI, or a LabVIEW application instance.

error in describes error conditions that occur prior to the execution of this function. The default input of this cluster is no error.

dup reference has the same value as reference.

error out contains error information. If error in indicates an error, error out contains the same error information. Otherwise error out describes the error status that this node produces.

Figure 17:
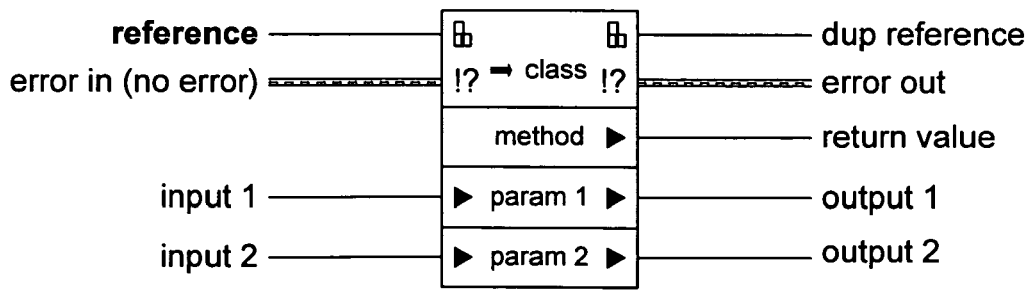

FIG. 17—Invoke Node

FIG. 17 illustrates the Invoke node. The Invoke node invokes a method or action on a VI or VI object. Thus, the Invoke node may be used to create/edit a graphical program. For example, a method may be invoked on a block diagram node to reposition the node, wire the node to another node, etc. Most methods have parameters associated with them. To select the method, the user pops up anywhere on the node and select Methods. Once the user selects the method, the associated parameters appear in the node, as shown in FIG. 17. The number of parameters shown may vary, depending on which method is selected. Each parameter may have an input terminal, output terminal, or both. An output terminal may be present for the return value of the method. The Invoke node may be used to invoke a number of different methods, including VI (virtual instrument), VI object, and application methods.

The inputs and outputs of the Invoke node are as follows:

reference is the refnum associated with a VI object, VI, or application on which the user desires to perform an action.

error in describes error conditions that occur prior to the execution of this function. The default input of this cluster is no error.

dup reference has the same value as reference.

error out contains error information. If error in indicates an error, error out contains the same error information. Otherwise error out describes the error status that this node produces.

FIG. 18—VI Server Refnum Controls

FIG. 18 illustrates user interface controls which may be placed on a front panel in order to interactively obtain a reference, such as a reference to a VI or an object of a VI. FIG. 18 illustrates exemplary front panel refnum controls for Application, Generic VI, and Strictly-typed VI data types. It is noted however, that a graphical programming system may provide such front panel refnum controls for any of the various objects associated with a VI, including terminals, etc. As shown in FIG. 18, the image in each refnum icon indicates the type of the refnum.

As shown in FIG. 18, VI references may be sub-divided into two classes of VIs: the Generic VI and the Strictly typed VI. In general, a Generic VI reference is used to perform editing operations (e.g., setting properties or invoking functions) on any VI, and a Strictly-typed VI reference is used to call a dynamically loaded VI as a sub-VI, and to perform operations that do not edit or change the VI. The Application class refnum icon displays the LabVIEW application icon. The Generic VI class refnum icon displays the VI file icon. The Strictly-typed VI class refnum icon depicts the connector pane that defines the class.

A front panel refnum provides a reference to an appropriate entity. Thus, the Application refnum provides a reference to a graphical programming application, e.g. a LabVIEW application, the generic VI refnum provides a reference to a generic virtual instrument or generic graphical program, and the strictly typed VI refnum provides a reference to a specified graphical program or VI. Other types of refnums provide references to their corresponding graphical program objects.

In the preferred embodiment, the user selects a VI Server front panel refnum control and places this refnum control in a front panel of a VI. The user then configures the refnum to be an appropriate type, such as an Application refnum, a Generic VI refnum, a Strictly-typed VI refnum, or another type of refnum. Once the user has configured the refnum control to the appropriate type, the refnum control takes on the respective appearance by the class selected by the user. For example, if the user drops the front panel refnum control on the front panel and configures the refnum to be of the Application class, the refnum takes on the Application icon appearance shown in FIG. 18.

When the user drops or places the VI Server refnum in the front panel and configures the refnum, corresponding terminals appear in the block diagram. These terminals provide the information on the application or graphical program referenced by the refnum.

Figure 21:
FIGS. 21 and 22 illustrate a user interface and block diagram, respectively, of an exemplary graphical program.
Figure 22:
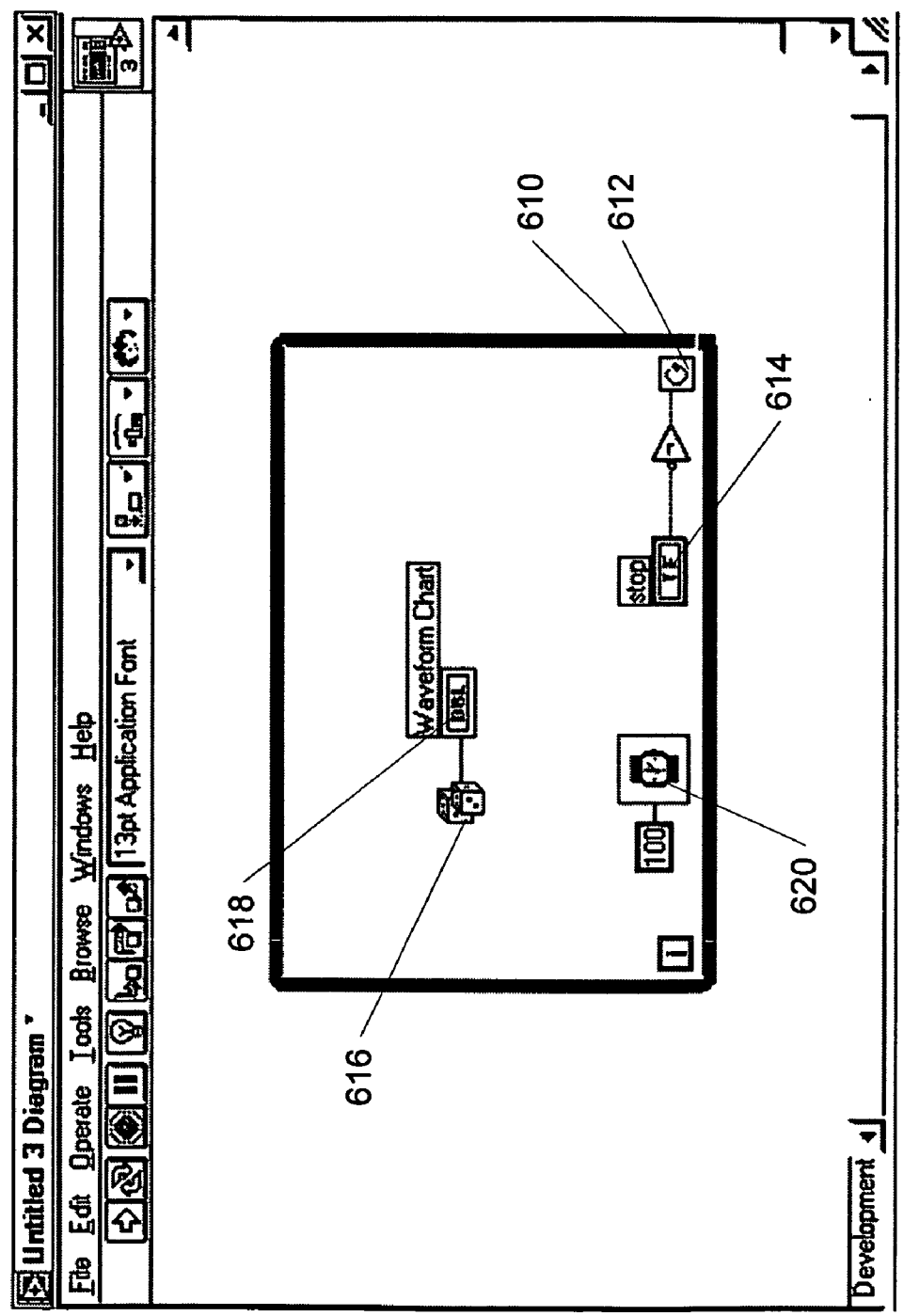
Figure 23A:
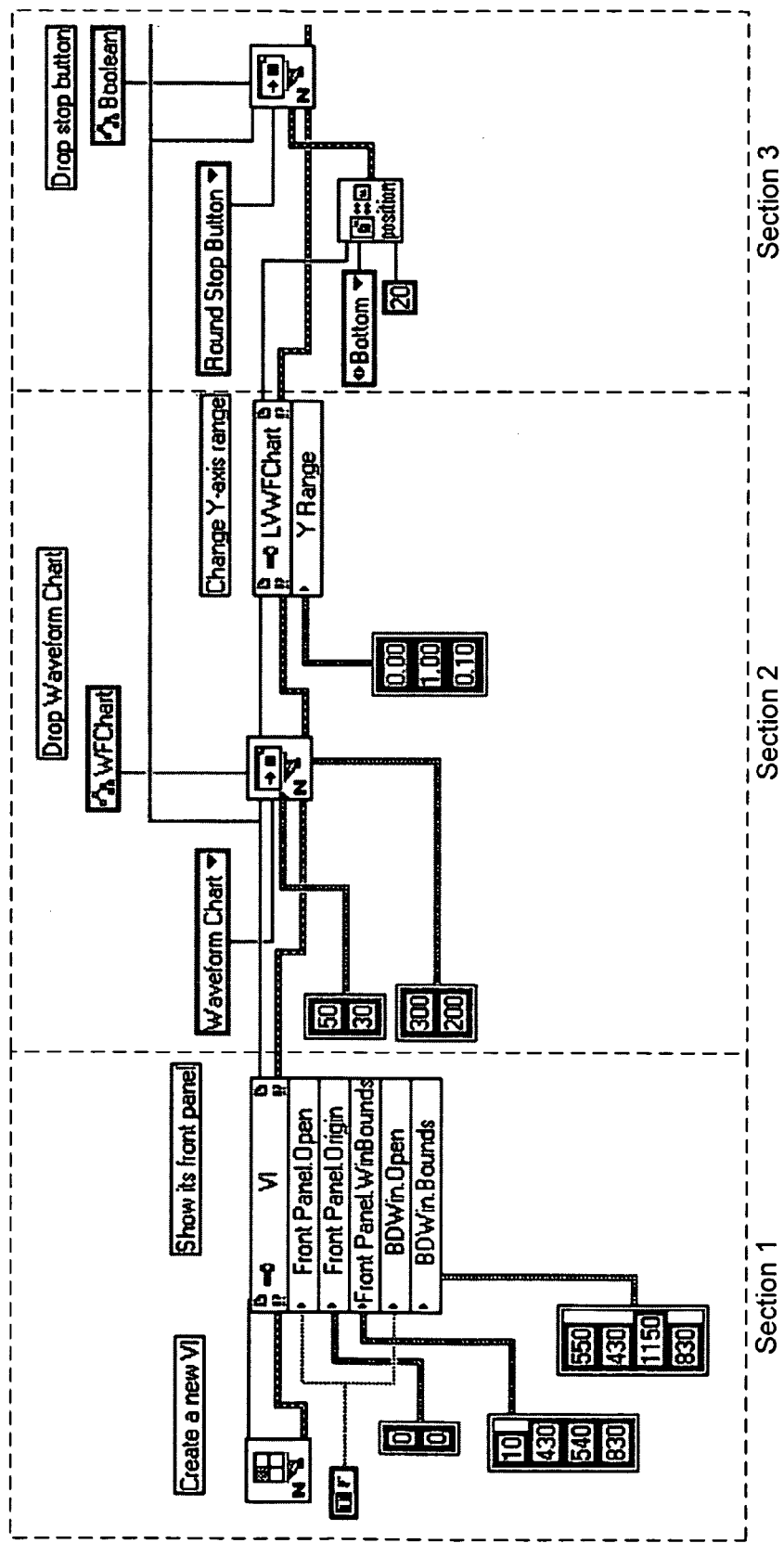
FIG. 23 (FIGS. 23A–23D) illustrates a client graphical program that creates the graphical program of FIGS. 21 and 22.
Figure 23B:
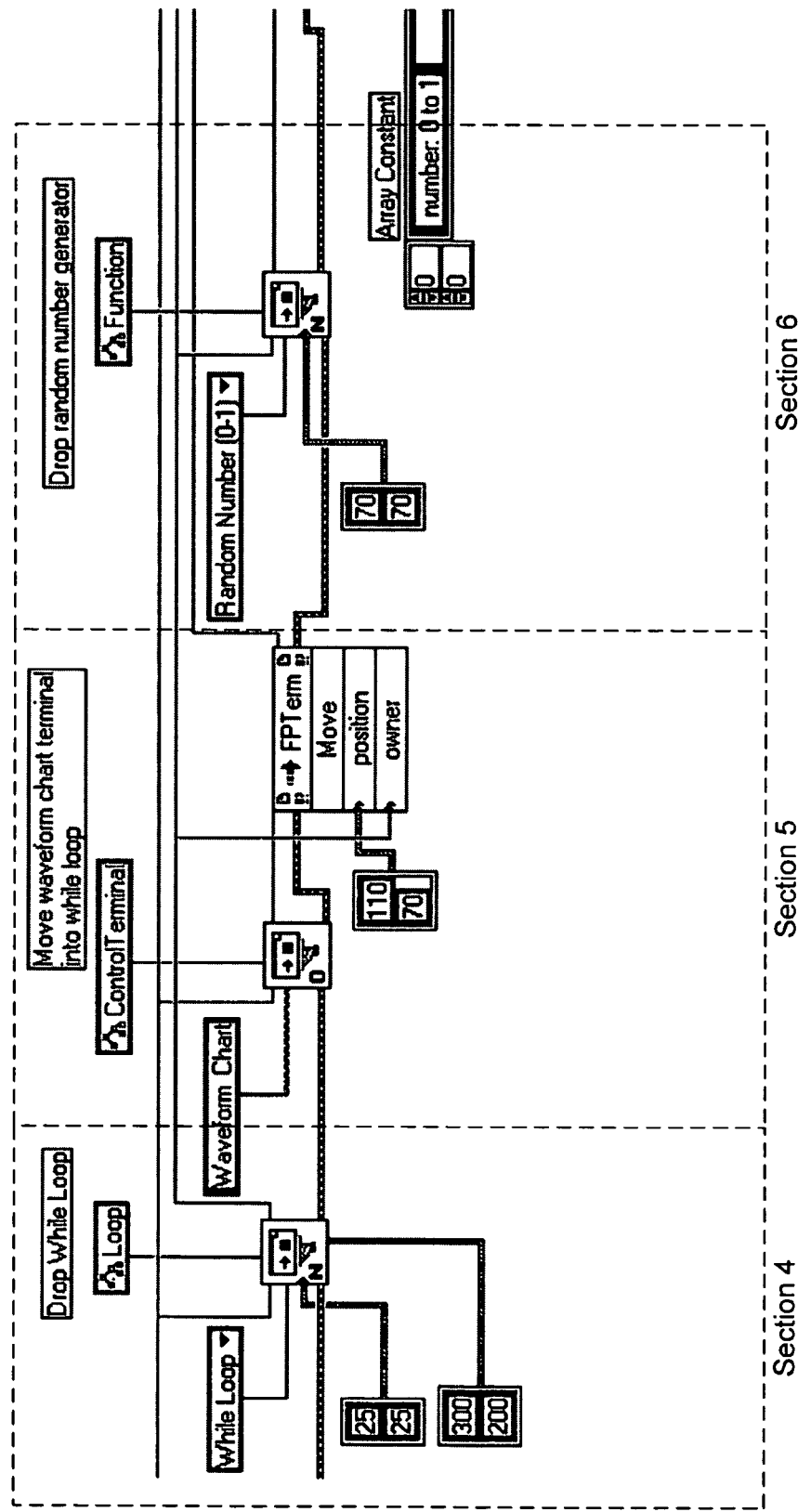
Figure 23C:
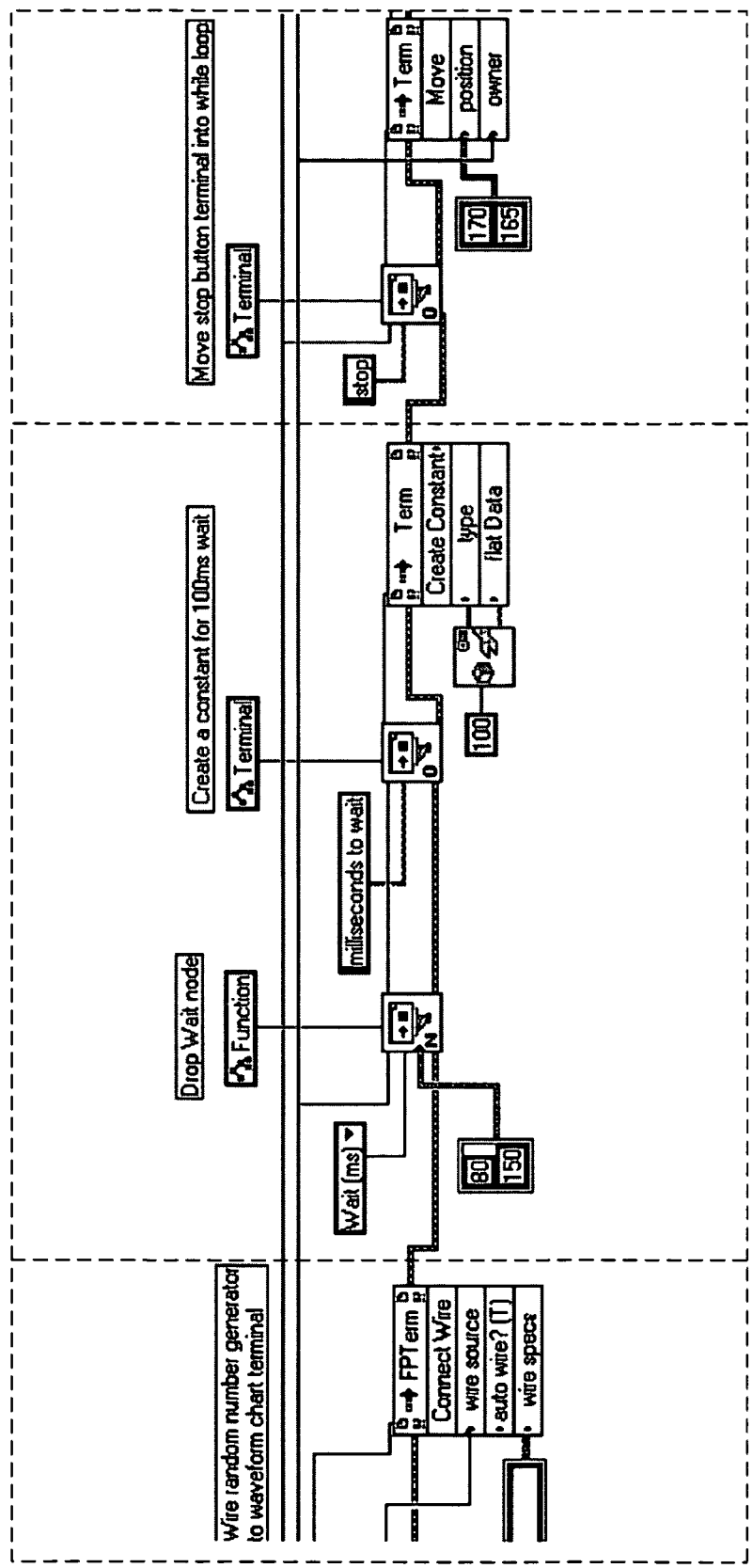
Figure 23D:
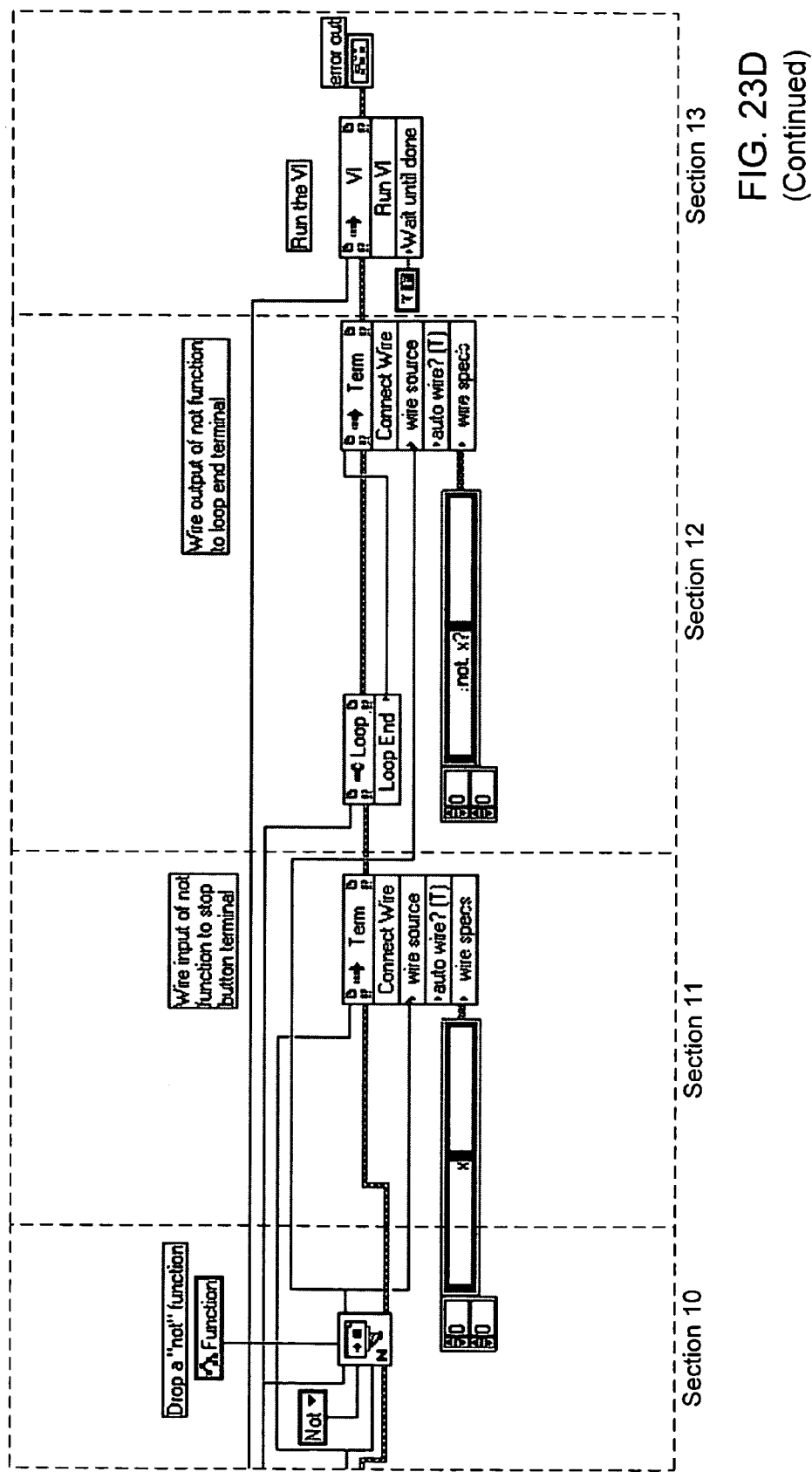

FIGS. 21–23: Programmatic Graphical Program Creation Example

FIG. 23 illustrates an exemplary client graphical program that uses the nodes described above to create the graphical program illustrated in FIGS. 21 and 22. The client graphical program of FIG. 23 may be created interactively by a user, as described above. FIGS. 21–23 are intended to be easily understandable examples illustrating the programmatic generation of a graphical program using the client graphical program nodes described above. In this example, the graphical program of FIG. 23 is operable to always programmatically generate the same graphical program, i.e., the graphical program of FIGS. 21–22. In other words, the graphical program of FIG. 23 is "hardcoded" to generate the graphical program of FIGS. 21–22. In a more typical case, a GPG program may be operable to generate a plurality of graphical programs, wherein the graphical program that is generated depends on program information received or processed by the GPG program, as described above.

FIG. 21 illustrates a user interface panel which includes a waveform chart control and a button control. FIG. 22 illustrates a block diagram representing the execution and data flow of the program. Each of the user interface controls of FIG. 21 has a corresponding user interface node in the FIG. 22 block diagram. The rectangular object 610 with the arrowhead is a while loop. The icon 612 is the condition terminal for the while loop 610.

When the program of FIGS. 21–22 is run, the graphical code shown within the while loop executes until the input to the condition terminal 612 becomes "false". As shown, the user interface node 614 for the stop button is connected to a boolean "Not" function. By default, the output of the stop button user interface node 614 is "false". When a user presses the stop button, the output of the node 614 becomes "true", and the input to the condition terminal 612 thus becomes "false". When this happens, the program terminates, since in this example there is no additional code to execute after the while loop ends.

The icon 616 represents a random number generator function node. The output terminal of the random number function node 616 is connected to the input terminal of the waveform chart user interface node 618. Thus, for each iteration of the while loop, a random number is generated and plotted on the waveform chart user interface control. FIG. 21 shows how the waveform chart may appear after several loop iterations. The icon 620 is simply a "wait" function icon with an input constant of 100, which causes a pause of 100 milliseconds for each loop iteration.

FIG. 23 illustrates a client graphical program which uses the nodes described above to programmatically create the graphical program of FIGS. 21 and 22. For clarity, the client graphical program is broken into sections, and the function of each section is described.

In section 1 of FIG. 23, a New VI Reference node is used to create a new graphical program. Since no application reference is passed to the New VI Reference node, the new graphical program is created by the default local LabVIEW application instance. The New VI Reference node outputs a reference to the new graphical program, and the Property node "reference" input receives this reference. As shown, the Property node sets various properties of the graphical program. For example, the origin and coordinate bounds of the user interface panel (front panel) are set, the coordinate bounds of the block diagram window are set, etc. As described above, a user may pop up a menu to select the desired property of an object to get or set. The list of displayed properties may vary according to what type of object the reference input references.

In section 2 of FIG. 23, a New VI Object Reference node is used to create the waveform chart user interface control. As shown, the reference to the new graphical program generated by the New VI Reference node in section 1 is connected as the "owner reference" input of the New VI Object Reference node. Other inputs are also connected which specify the type of object to create, the position to place the object, etc. Once the waveform control is created, the New VI Object Reference node outputs a reference to the waveform control. The property node of section 2 receives this reference input and changes the Y axis range of the waveform control to range from 0.0 to 1.0.

In section 3 of FIG. 23, a New VI Object Reference node is used to create the stop button user interface control. A positioning function is used to specify the position input for the node, in order to appropriately position the button under the waveform chart on the user interface panel.

In section 4 of FIG. 23, a New VI Object Reference node is used to create and position the while loop.

In section 5 of FIG. 23, an Open VI Object Reference node is used to obtain a reference to the user interface node on the block diagram corresponding to the waveform chart user interface control. As shown, a "Control Terminal" data type is specified as the class of the object for which to obtain a reference, "Waveform Chart" is specified as the name of the object for which to obtain a reference, and the reference to the new graphical program is specified as the owner reference. Together, these inputs identify the waveform chart user interface node. Once the reference to the waveform chart user interface node is obtained, the reference is connected to the reference input of the Invoke node shown in section 5. The Invoke node invokes a "Move" method on the waveform chart user interface node, moving it into the area bounded by the while loop. As described above, a user may pop up a menu to select the desired method to invoke on an object. The list of displayed methods may vary according to what type of object the reference input references.

In section 6 of FIG. 23, a New VI Object Reference node is used to create the random number generator function. As shown, the reference to the while loop created in section 4 is used as the "owner reference" input of the New VI Object Reference node. Thus, the random number function is created within the while loop.

In section 7 of FIG. 23, an Invoke node is used to connect the random number generator function to the waveform chart user interface node. As shown, the reference to the waveform chart user interface node is connected to the reference input of the Invoke node. Once the user selects the "Connect Wire" method as the method to invoke, the Invoke node displays a list of relevant input parameters. As shown, the reference to the random number generator function node is supplied as the "wire source" input parameter. Thus, when the Invoke node invokes the "Connect Wire" method, the random number generator function node is connected to the waveform chart user interface node.

In section 8 of FIG. 23, a New VI Object Reference node is used to create a wait function node, an Open VI Object Reference node is used to obtain a reference to the "milliseconds to wait" input terminal of the wait function node, and an Invoke node is used to create a numeric constant of 100 which is connected to the "milliseconds to wait" input terminal of the wait function node.

In section 9 of FIG. 23, the stop button user interface node is moved inside the area bounded by the while loop. Section 9 is similar to section 5 described above.

In section 10 of FIG. 23, a New VI Object Reference node is used to create a "Not" boolean function inside the while loop. Section 10 is similar to the sections described above.

In section 11 of FIG. 23, an Invoke node is used to connect the stop button user interface node to the Not function node. Section 11 is similar to section 7 described above.

In section 12 of FIG. 23, a Property node is used to obtain a reference to the loop condition terminal of the while loop. The reference to the condition terminal is connected as the reference input to the Invoke node shown in section 12, and the Invoke node connects the output of the Not function node to the condition terminal of the while loop, similarly to the sections described above.

In section 13 of FIG. 23, an Invoke node is used to run the newly created graphical program. As shown, the reference to the new graphical program is connected to the reference input of the Invoke node, and a "Run" method is selected as the method to invoke on the program. Although omitted from the above description, error information is propagated through the FIG. 23 client program, and the "error out" node shown in section 13 receives the final error status of the program.

Although this example is primarily concerned with creating a new graphical program, it is noted that the above-described functionality also enables programmatic editing of a graphical program. References to graphical program objects may be obtained, and various properties may be set and various methods may be invoked to move objects, resize objects, add/remove objects, reconnect objects, etc., similarly to the description above. In the preferred embodiment, any operation which a program developer may perform interactively may also be performed programmatically.

Text-Based Client Program

As described above, client programs may also be text-based programs. In the preferred embodiment, a text-based program may obtain a reference to a software component that includes an interface with functions or methods to perform operations similar to those performed by the nodes described above. For example, a program may obtain a reference to an ActiveX component, where the interface for the ActiveX component includes a CreateNewProgram method which is comparable to the New VI Reference node, a GetProgramObjectReference method which is comparable to the Open VI Object Reference node described above, etc.

In the preferred embodiment, various types of software components are provided which enable programs of various languages executing on various systems to programmatically create/edit graphical programs. As is well known in the art, modem component-based software architecture and object oriented design techniques make it relatively straightforward to encapsulate portions of code and provide various interfaces to the code. For example, a service to create/edit a graphical program may be exposed as an ActiveX component, a CORBA component, a JAVA component, etc. In one embodiment, the implementation of the nodes described above and the implementation of components for use in text-based programs may be based on a common code base.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-implemented method for automatically generating a new graphical program, comprising:

executing a graphical program generation (GPG) program;

the GPG program receiving information, wherein the information specifies functionality of the new graphical program, wherein the information does not specify specific objects for the new graphical program; and the GPG program automatically generating the new graphical program in response to said information specifying the functionality of the new graphical program, wherein the new graphical program implements the specified functionality, and wherein the new graphical program comprises a plurality of interconnected nodes that visually indicate the functionality of the new graphical program;

wherein said automatically generating the new graphical program is performed without direct user input specifying the new graphical program.

2. The method of claim 1, wherein said automatically generating the new graphical program is performed without direct user input selecting the plurality of nodes and without direct user input specifying the interconnections between the plurality of nodes.

3. The method of claim 1, wherein the new graphical program comprises a block diagram portion comprising the plurality of interconnected nodes and a user interface portion; and wherein said automatically generating the new graphical program includes automatically generating the block diagram portion and the user interface portion.

4. The method of claim 1, wherein said automatically generating the new graphical program comprises:

creating a plurality of graphical program objects in the new graphical program; and interconnecting the plurality of graphical program objects in the new graphical program;

wherein the interconnected plurality of graphical program objects comprise at least a portion of the new graphical program.

5. The method of claim 1, wherein said automatically generating the new graphical program comprises:

creating one or more user interface objects in the new graphical program, wherein the one or more user interface objects perform one or more of providing input to or displaying output from the new graphical program.

6. The method of claim 1, wherein the new graphical program is a virtual instrument.

7. The method of claim 1, wherein the GPG program is a graphical program.

8. The method of claim 1, wherein the information received by the GPG program specifies a computational process; and wherein the GPG program is operable to generate a new graphical program that implements the specified computational process.

9. The method of claim 1, wherein the information received by the GPG program specifies an algorithm; and wherein the GPG program is operable to generate a new graphical program that implements the specified algorithm.

10. The method of claim 1, wherein the information received by the GPG program specifies a state diagram; and wherein the GPG program is operable to generate a new graphical program that implements the specified state diagram.

11. The method of claim 1, wherein the information received by the GPG program specifies a prototype; and wherein the GPG program is operable to generate a new graphical program that implements the specified prototype.

12. The method of claim 1, wherein the information received by the GPG program specifies a test executive sequence; and wherein the GPG program is operable to generate a new graphical program that implements the specified test executive sequence.

13. The method of claim 1, wherein said GPG program receiving information comprises the GPG program receiving user input specifying desired functionality of the new graphical program; and wherein the GPG program is operable to generate a new graphical program that implements the specified desired functionality.

14. The method of claim 13, wherein the GPG program comprises a graphical programming development environment application.

15. The method of claim 1, wherein the information received by the GPG program specifies an instrumentation function; and wherein the GPG program is operable to generate a new graphical program that implements the specified instrumentation function.

16. The method of claim 15, wherein the instrumentation function comprises one or more of:

a test and measurement function; or an industrial automation function.

17. The method of claim 1,
wherein the information received by the GPG program comprises information regarding an existing program having program functionality; and
wherein the GPG program is operable to generate a new graphical program that implements at least a portion of the program functionality of the existing program.

18. The method of claim 17,
wherein the existing program is a graphical program.

19. The method of claim 1,
wherein the GPG program is operable to generate a plurality of new graphical programs, depending on the received information.

20. The method of claim 1,
wherein the new graphical program generated by the GPG program has program functionality; and
wherein the GPG program is operable to determine at least a portion of the program functionality independently of the received information.

21. The method of claim 1,
wherein the GPG program is operable to generate the new graphical program such that the new graphical program implements additional functionality in addition to the functionality specified by the received information.

22. The method of claim 1,
wherein the new graphical program comprises graphical program code; and
wherein the GPG program is operable to receive code generation information specifying how to generate at least a portion of the graphical program code.

23. The method of claim 1,
wherein said GPG program automatically generating the new graphical program comprises the GPG program calling an application programming interface (API) enabling the automatic generation of a graphical program.

24. The method of claim 1,
wherein said GPG program automatically generating the new graphical program comprises the GPG program automatically requesting a server program to generate the new graphical program.

25. The method of claim 24,
wherein the server program is an application instance of a graphical programming environment.

26. The method of claim 1,
wherein the GPG program comprises a client portion and a server portion; and
wherein the client portion is operable to utilize an application programming interface (API) in order to direct the server program to automatically generate the new graphical program.

27. The method of claim 26,
wherein the client portion of the GPG program executes in a first computer system;
wherein the server portion of the GPG program executes in a second computer system; and
wherein the first computer system is connected to the second computer system.

28. The method of claim 1, further comprising:
executing the new graphical program;
wherein the new graphical program is operable to perform the specified functionality during execution.

29. The method of claim 1,
wherein the new graphical program implements only a portion of the specified functionality.

30. The method of claim 1, wherein the new graphical program is a partial program, the method further comprising:
adding additional graphical code to the new graphical program, in response to manual user input, in order to complete the new graphical program.

31. The method of claim 1,
wherein said automatically generating the new graphical program comprises including at least one graphical program object in the new graphical program.

32. The method of claim 31, wherein the new graphical program includes a block diagram, wherein the at least one graphical program object comprises a function node placed in the block diagram.

33. The method of claim 31, wherein the new graphical program includes a block diagram, wherein the at least one graphical program object comprises a automatic structure placed in the block diagram.

34. The method of claim 31, wherein the new graphical program includes a user interface panel, wherein the at least one graphical program object comprises a user interface object placed in the user interface panel.

35. The method of claim 34, wherein the user interface object is a user interface input object placed in the user interface panel for performing one or more of: viewing input to the new graphical program; or providing input to the new graphical program.

36. The method of claim 34, wherein the user interface object is a user interface output object placed in the user interface panel for viewing output of the new graphical program.

37. The method of claim 34, wherein the new graphical program also includes a block diagram, wherein the user interface object is a user interface input object placed in the user interface panel for performing one or more of: viewing input to the block diagram; or providing input to the new graphical program.

38. The method of claim 34, wherein the new graphical program also includes a block diagram, wherein the user interface object is a user interface output object placed in the user interface panel for viewing output from the block diagram.

39. The method of claim 1, wherein said automatically generating the new graphical program comprises:
including a first graphical program object and a second graphical program object in the new graphical program; and
connecting the first graphical program object to the second graphical program object.

40. The method of claim 39, wherein said connecting the first graphical program object to the second graphical program object comprises connecting an input of the first graphical program object to an output of the second graphical program object.

41. The method of claim 1,
wherein the GPG program is a graphical program;
wherein the GPG program includes at least one object creation node for automatically creating at least one graphical program object in the new graphical program; and
wherein said generating the new graphical program comprises including the at least one graphical program object in the new graphical program.

42. The method of claim 41, wherein the GPG program further includes a property node, the method further comprising:
the property node getting or setting a property of the graphical program object in response to said executing the GPG program.

43. The method of claim 42, wherein the object creation node outputs a reference to the graphical program object;
wherein the property node receives the reference as input to the graphical program object; and
wherein the property node gets or sets a property of the graphical program object specified by the reference to the graphical program object.

44. The method of claim 41, wherein the GPG program further includes an invoke node; the method further comprising:
the invoke node invoking a method on the graphical program object in response to said executing the GPG program.

45. The method of claim 44, wherein the object creation node outputs a reference to the graphical program object;
wherein the invoke node receives as input the reference to the graphical program object; and
wherein the invoke node invokes a method on the graphical program object specified by the reference to the graphical program object.

46. The method of claim 41, further comprising:
configuring the object creation node of the GPG program;
wherein said configuring comprises specifying a graphical program object class for the object creation node; and
wherein the at least one graphical program object included in the new graphical program is of the graphical program object class.

47. The method of claim 1,
wherein the GPG program is a graphical program; and
wherein the GPG program includes a graphical program creation node for automatically creating the new graphical program.

48. A computer-implemented method for automatically modifying an existing graphical program, comprising:
executing a GPG program;
the GPG program receiving information during program execution, wherein the information specifies functionality to add to the existing graphical program, wherein the information does not specify specific objects to add to the existing graphical program;
the GPG program automatically modifying the existing graphical program in order to implement the specified functionality, in response to receiving the information, wherein the existing graphical program comprises a plurality of interconnected nodes that visually indicate the specified functionality of the existing graphical program;
wherein said automatically modifying the existing graphical program modifies the existing graphical program without direct user input specifying the modification to the existing graphical program during said modifying.

49. The method of claim 48, wherein said automatically modifying the existing graphical program modifies the existing graphical program without direct user input specifying modification to the plurality of nodes and without direct user input specifying modification to the interconnections between the plurality of nodes.

50. The method of claim 48,
wherein said modifying the existing graphical program comprises adding graphical code to the existing graphical program.

51. The method of claim 48,
wherein said receiving information during program execution comprises receiving user input specifying desired functionality to add to the existing graphical program.

52. A computer-implemented method for automatically generating a new graphical program, comprising:
providing information specifying functionality of the new graphical program, wherein the information does not specify specific objects for the new graphical program;
executing a graphical program generation (GPG) program;
the GPG program automatically generating the new graphical program using said information, wherein the new graphical program implements the specified functionality, and wherein the new graphical program comprises a plurality of interconnected nodes that visually indicate the functionality of the new graphical program;
wherein said automatically generating the new graphical program creates the new graphical program without direct user input specifying the new graphical program.

53. The method of claim 52, wherein said automatically generating the new graphical program creates the new graphical program without direct user input selecting the plurality of nodes and without direct user input specifying the interconnections between the nodes.

54. A memory medium for automatically generating a new graphical program, the memory medium comprising program instructions executable to:
receive information, wherein the information specifies functionality of the new graphical program, wherein the information does not specify specific objects for the new graphical program;
automatically generate the new graphical program in response to said information specifying the functionality of the new graphical program, wherein the new graphical program implements the specified functionality, wherein the new graphical program comprises a plurality of interconnected nodes that visually indicate the functionality of the new graphical program, and wherein said automatically generating the new graphical program creates the new graphical program without direct user input specifying the new graphical program.

55. The memory medium of claim 54, wherein said automatically generating the new graphical program creates the new graphical program without direct user input selecting the plurality of nodes and without direct user input specifying the interconnections between the nodes.

56. The memory medium of claim 54, wherein the new graphical program comprises a block diagram portion comprising the plurality of interconnected nodes and a user interface portion;
wherein said automatically generating the new graphical program includes generating the block diagram portion and the user interface portion.

57. A system for automatically generating a new graphical program, the system comprising:
a processor coupled to a memory, wherein the memory stores a graphical program generation (GPG) program;
wherein the processor is operable to execute the GPG program in order to:
receive information specifying functionality of the new graphical program, wherein the information does not specify specific objects for the new graphical program; and
automatically generate the new graphical program in response to said information specifying the functionality of the new graphical program, wherein the new graphical program implements the specified functionality, and wherein the new graphical program comprises a plurality of interconnected nodes that visually indicate the functionality of the new graphical program, and wherein the new graphical program is automatically generated without direct user input specifying the new graphical program.

58. The system of claim 57, wherein said automatically generating the new graphical program creates the new graphical program without direct user input selecting the plurality of nodes and without direct user input specifying the interconnections between the nodes.

59. The system of claim 57, wherein the new graphical program comprises a block diagram portion comprising the plurality of interconnected nodes and a user interface portion;
wherein said automatically generating the new graphical program includes generating the block diagram portion and the user interface portion.

60. The system of claim 57, wherein said automatically generating the new graphical program comprises:
creating a plurality of graphical program objects in the new graphical program without direct user input specifying the plurality of graphical program objects; and
interconnecting the plurality of graphical program objects in the new graphical program without direct user input specifying the interconnections between the nodes;
wherein the interconnected plurality of graphical program objects comprise at least a portion of the new graphical program.

61. The memory medium of claim 54, wherein, in automatically generating the new graphical program, the program instructions are executable to:
automatically create a plurality of graphical program objects in the new graphical program; and
automatically interconnect the plurality of graphical program objects in the new graphical program;
wherein the interconnected plurality of graphical program objects comprise at least a portion of the new graphical program.

62. The memory medium of claim 54, wherein, in automatically generating the new graphical program, the program instructions are executable to:
automatically create one or more user interface objects in the new graphical program, wherein the one or more user interface objects perform one or more of providing input to or displaying output from the new graphical program.

63. The memory medium of claim 54,
wherein the new graphical program implements a measurement function.

64. The memory medium of claim 54, wherein, in receiving information, the program instructions are executable to:
receive user input specifying desired functionality of the new graphical program, wherein the generated new graphical program implements the specified desired functionality.

65. The memory medium of claim 54,
wherein said receiving and said generating are performed by a graphical programming development environment application.

66. The memory medium of claim 54,
wherein the received information comprises information regarding an existing program having program functionality; and
wherein the generated new graphical program implements at least a portion of the program functionality of the existing program.

67. The memory medium of claim 54, wherein the program instructions are further executable to:
automatically generate a plurality of new graphical programs, depending on the received information.

68. The memory medium of claim 54,
wherein the generated new graphical program implements additional functionality in addition to the functionality specified by the received information.

69. The memory medium of claim 54,
wherein the new graphical program implements only a portion of the specified functionality.

70. The memory medium of claim 54, wherein the new graphical program is a partial program, and wherein the program instructions are further executable to:
add additional graphical code to the new graphical program in response to manual user input in order to complete the new graphical program.

71. A computer-implemented method for automatically generating a new graphical program, comprising:
receiving information, wherein the information specifies functionality of the new graphical program, wherein the information does not specify specific objects for the new graphical program; and
automatically generating the new graphical program in response to said information specifying the functionality of the new graphical program, wherein the new graphical program implements the specified functionality, and wherein the new graphical program comprises a plurality of interconnected nodes that visually indicate the functionality of the new graphical program;
wherein said automatically generating the new graphical program is performed without direct user input including the plurality of nodes or connecting the plurality of nodes.

72. The method of claim 71, wherein said automatically generating the new graphical program comprises:
automatically creating a plurality of graphical program objects in the new graphical program; and
automatically interconnecting the plurality of graphical program objects in the new graphical program;
wherein the interconnected plurality of graphical program objects comprise at least a portion of the new graphical program.

73. The method of claim 71, wherein said automatically generating the new graphical program comprises:
automatically creating one or more user interface objects in the new graphical program, wherein the one or more user interface objects perform one or more of providing input to or displaying output from the new graphical program.

74. The method of claim 71,
wherein the new graphical program implements a measurement function.

75. The method of claim 71,
wherein said receiving information comprises receiving user input specifying desired functionality of the new graphical program; and
wherein the generated new graphical program implements the specified desired functionality.

76. The method of claim 71,
wherein said receiving and said generating are performed by a graphical programming development environment application.

77. The method of claim 71,
wherein the received information comprises information regarding an existing program having program functionality; and
wherein the generated new graphical program implements at least a portion of the program functionality of the existing program.

78. The method of claim 71, further comprising:
automatically generating a plurality of new graphical programs, depending on the received information.

79. The method of claim 71,
wherein the generated new graphical program implements additional functionality in addition to the functionality specified by the received information.

80. The method of claim 71,
wherein the new graphical program implements only a portion of the specified functionality.

81. The method of claim 71, wherein the new graphical program is a partial program, the method further comprising:
adding additional graphical code to the new graphical program, in response to manual user input, in order to complete the new graphical program.

* * * * *